US012632579B2

(12) United States Patent
Dhouib et al.

(10) Patent No.: US 12,632,579 B2
(45) Date of Patent: May 19, 2026

(54) DATASET PRIVACY MANAGEMENT SYSTEM

(71) Applicant: Accenture Global Solutions Limited, Dublin (IE)

(72) Inventors: Baya Dhouib, Valbonne (FR); Bini Samuel Yao, Cagnes-sur-Mer (FR)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 483 days.

(21) Appl. No.: 18/066,767

(22) Filed: Dec. 15, 2022

(65) Prior Publication Data

US 2024/0095385 A1      Mar. 21, 2024

Related U.S. Application Data

(60) Provisional application No. 63/376,568, filed on Sep. 21, 2022.

(51) Int. Cl.
    *G06F 21/62*      (2013.01)
(52) U.S. Cl.
    CPC .................................. *G06F 21/6218* (2013.01)
(58) Field of Classification Search
    CPC .............. G06F 21/6254; G06F 21/577; G06F 21/6218; G06F 21/6245; G06F 21/6227
    See application file for complete search history.

(56) References Cited

U.S. PATENT DOCUMENTS

| | | | |
|---|---|---|---|
| 9,537,880 B1 * | 1/2017 | Jones | H04L 63/1433 |
| 9,787,638 B1 * | 10/2017 | Adams | H04L 63/1408 |
| 12,079,814 B2 * | 9/2024 | Harris | G06Q 20/4016 |
| 12,549,603 B2 * | 2/2026 | Ghosh | G06F 21/6218 |
| 2011/0258206 A1 * | 10/2011 | El Emam | G06Q 30/02 707/754 |
| 2017/0286671 A1 * | 10/2017 | Chari | G06F 21/552 |
| 2018/0026944 A1 * | 1/2018 | Phillips | H04L 63/1433 726/4 |
| 2019/0156028 A1 * | 5/2019 | Hay | G06F 21/563 |

(Continued)

OTHER PUBLICATIONS

Y. Hua, Z. Li, B. Wang and J. Li, "A Method for Solving Quasi-Identifiers of Single Structured Relational Data," in IEEE Access, vol. 9, pp. 166293-166302, 2021. (Year: 2021).*

(Continued)

*Primary Examiner* — Kari L Schmidt
(74) *Attorney, Agent, or Firm* — Mannava & Kang, P.C.

(57) ABSTRACT

In some implementations, a dataset evaluation system may receive a target dataset. The dataset evaluation system may-processing the target dataset to generate a normalized target dataset. The dataset evaluation system may process the normalized target dataset with an intruder dataset to identify whether any quasi-identifiers are present in the normalized target dataset. The dataset evaluation system may determine a Cartesian product of the normalized target dataset and the intruder dataset. The dataset evaluation system may compute, using a distance linkage disclosure technique, an inference risk score for the target dataset with the intruder dataset based on the Cartesian product and whether any quasi-identifiers are present in the normalized target dataset. The dataset evaluation system may output information associated with the inference risk score.

19 Claims, 18 Drawing Sheets

300

(56) References Cited

U.S. PATENT DOCUMENTS

| | | | | |
|---|---|---|---|---|
| 2019/0220607 A1* | 7/2019 | Dodor | G06F 16/27 |
| 2020/0057953 A1* | 2/2020 | Livny | G06N 5/048 |
| 2020/0082290 A1* | 3/2020 | Pascale | G06N 20/00 |
| 2020/0117833 A1* | 4/2020 | Pletea | G16H 70/60 |
| 2020/0327252 A1* | 10/2020 | Mcfall | G06F 21/78 |
| 2021/0279367 A1* | 9/2021 | Khan | G06F 21/577 |
| 2022/0050917 A1* | 2/2022 | Jiang | G06F 21/577 |
| 2022/0164471 A1* | 5/2022 | Braghin | G06F 16/213 |
| 2022/0222374 A1* | 7/2022 | Antoniou | G06F 21/6254 |
| 2022/0300651 A1* | 9/2022 | Mondal | G06F 21/6254 |
| 2023/0052848 A1* | 2/2023 | Zhang | G06F 11/3684 |
| 2023/0237409 A1* | 7/2023 | Mallikarjun | G06Q 10/06375 705/7.37 |

OTHER PUBLICATIONS

Di Vimercati, Sabrina De Capitani, et al. "Scalable distributed data anonymization for large datasets." IEEE Transactions on Big Data 9.3 (2022): pp. 818-831. (Year: 2022).*

Ghinita, Gabriel, et al. "A framework for efficient data anonymization under privacy and accuracy constraints." ACM Transactions on Database Systems (TODS) 34.2 (2009): pp. 1-47. (Year: 2009).*

Soria-Comas, J. et al., "Assessing Disclosure Risk via Record Linkage by a Maximum-Knowledge Intruder," UNESCO Chair in Data Privacy, Dept. of Computer Engineering and Maths, Universitat Rovira i Virgili, Av. Pa¨isos Catalans 26, 43007 Tarragona, Catalonia, 2015, 12 pages.

* cited by examiner

354

Anonymized Dataset

Different clustering techniques are applied on the anonymized dataset and the intersections of the different clusters is computed

300

700

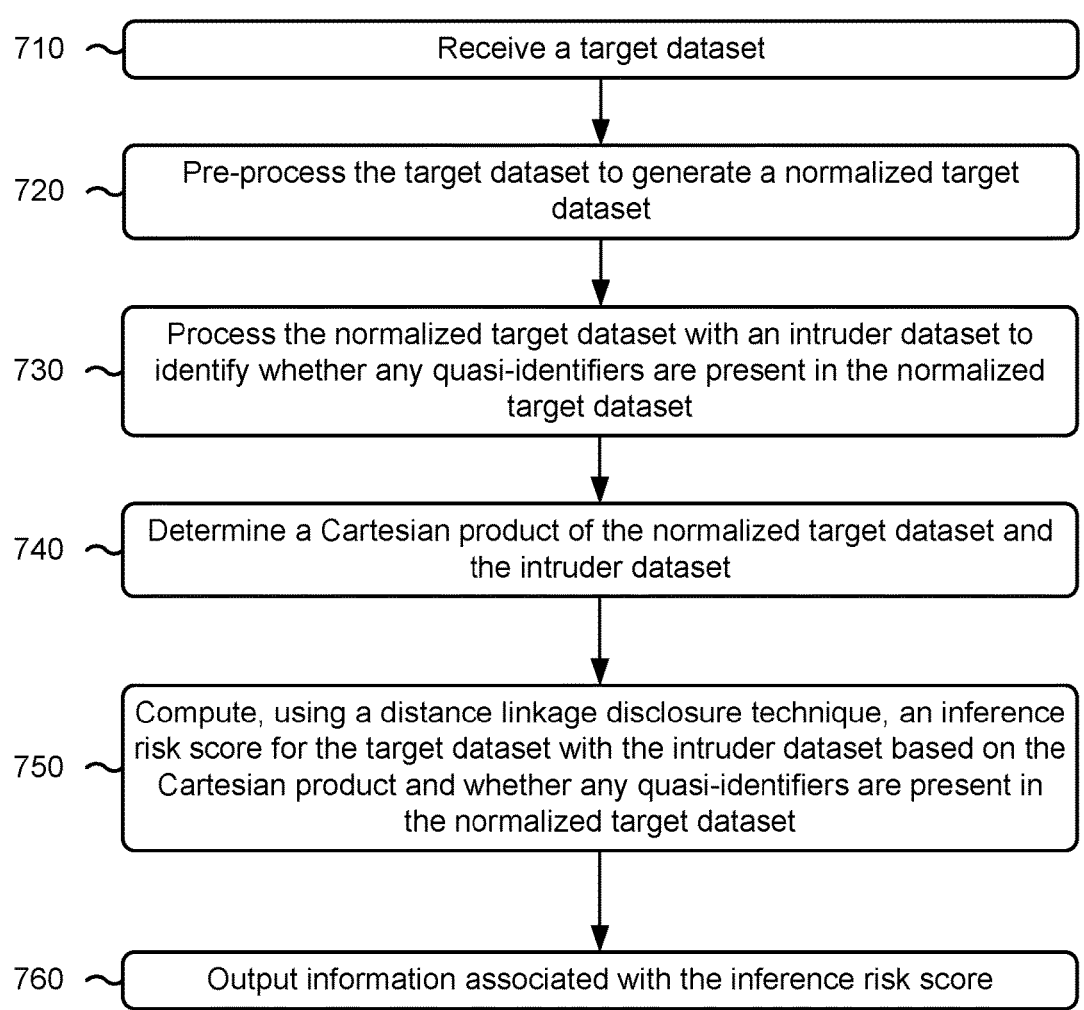

710 — Receive a target dataset

720 — Pre-process the target dataset to generate a normalized target dataset

730 — Process the normalized target dataset with an intruder dataset to identify whether any quasi-identifiers are present in the normalized target dataset 740 — Determine a Cartesian product of the normalized target dataset and the intruder dataset 750 — Compute, using a distance linkage disclosure technique, an inference risk score for the target dataset with the intruder dataset based on the Cartesian product and whether any quasi-identifiers are present in the normalized target dataset 760 — Output information associated with the inference risk score

FIG. 7

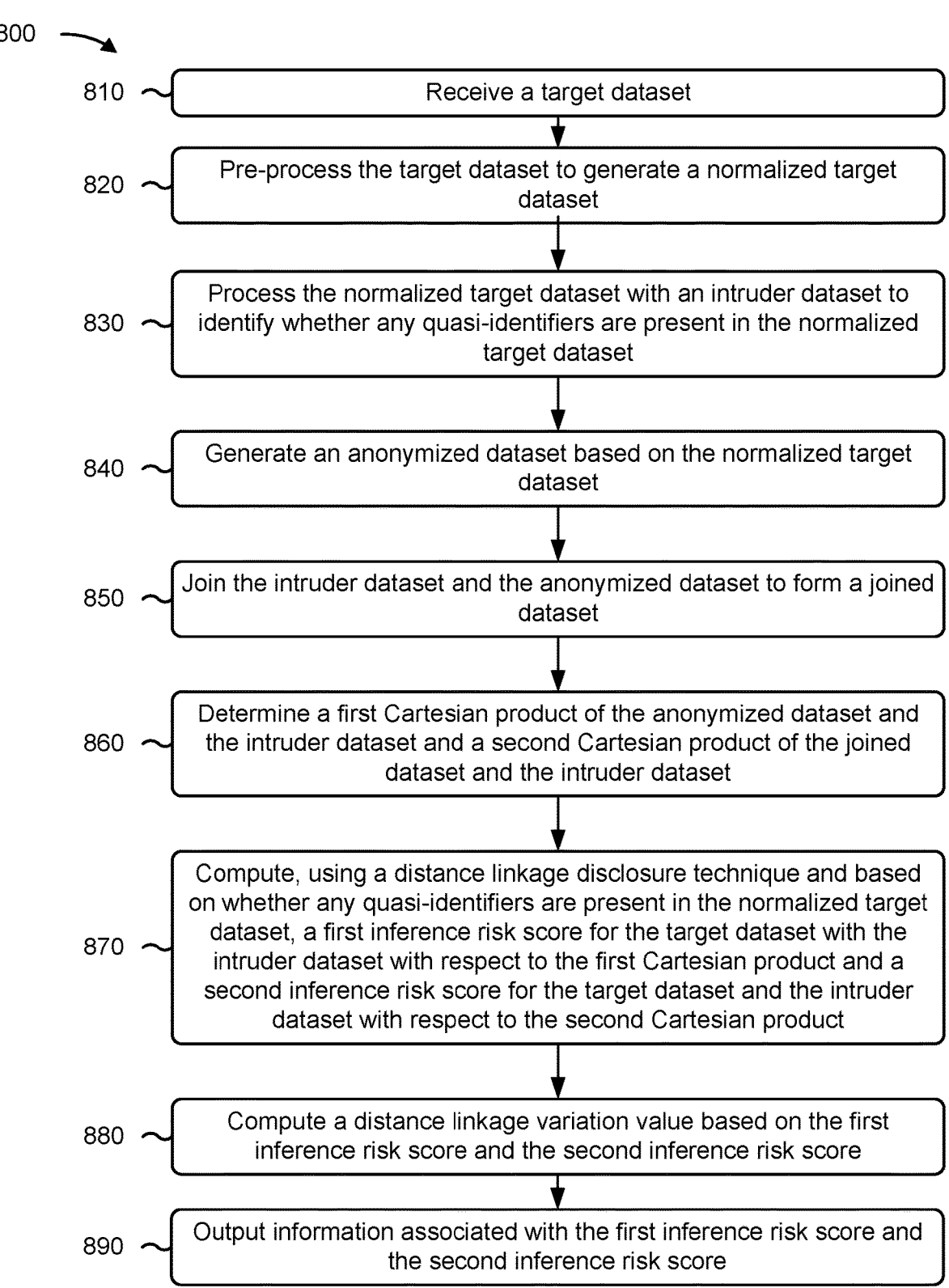

800

810  Receive a target dataset

820  Pre-process the target dataset to generate a normalized target dataset

830  Process the normalized target dataset with an intruder dataset to identify whether any quasi-identifiers are present in the normalized target dataset 840  Generate an anonymized dataset based on the normalized target dataset 850  Join the intruder dataset and the anonymized dataset to form a joined dataset 860  Determine a first Cartesian product of the anonymized dataset and the intruder dataset and a second Cartesian product of the joined dataset and the intruder dataset 870  Compute, using a distance linkage disclosure technique and based on whether any quasi-identifiers are present in the normalized target dataset, a first inference risk score for the target dataset with the intruder dataset with respect to the first Cartesian product and a second inference risk score for the target dataset and the intruder dataset with respect to the second Cartesian product 880  Compute a distance linkage variation value based on the first inference risk score and the second inference risk score 890  Output information associated with the first inference risk score and the second inference risk score

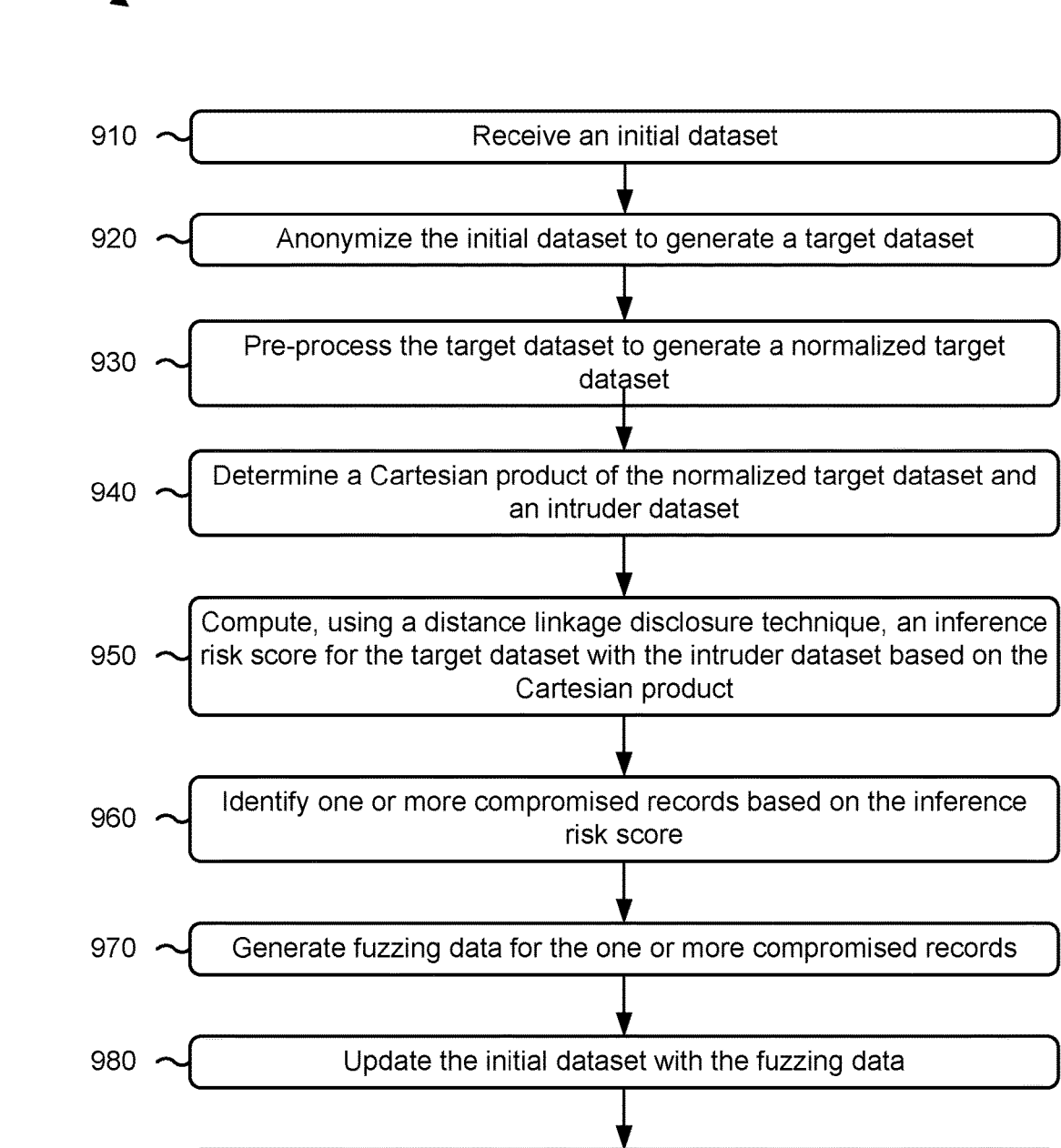

910 — Receive an initial dataset

920 — Anonymize the initial dataset to generate a target dataset

930 — Pre-process the target dataset to generate a normalized target dataset

940 — Determine a Cartesian product of the normalized target dataset and an intruder dataset 950 — Compute, using a distance linkage disclosure technique, an inference risk score for the target dataset with the intruder dataset based on the Cartesian product 960 — Identify one or more compromised records based on the inference risk score 970 — Generate fuzzing data for the one or more compromised records 980 — Update the initial dataset with the fuzzing data 990 — Output information associated with the initial dataset based on updating the initial dataset

FIG. 9

DATASET PRIVACY MANAGEMENT SYSTEM

CROSS-REFERENCE TO RELATED APPLICATION

This patent application claims priority to U.S. Provisional Patent Application No. 63/376,568, filed on Sep. 21, 2022, and entitled "DATASET PRIVACY MANAGEMENT SYSTEM." The disclosure of the prior application is considered part of and is incorporated by reference into this patent application.

BACKGROUND

A de-identified dataset is a dataset that does not identify an entity that is a subject of the data in the dataset. For example, census data may be de-identified such that researchers can use the census data for analysis without identifying any individual whose responses are included in the census data. Similarly, medical data may be de-identified such that researchers can use the medical information for public health analysis without identifying any individual whose medical information was included in the medical data. Entities may also include companies (e.g., such as for economic datasets), schools (e.g., such as for education datasets), or computing devices (e.g., such as for network analysis datasets), among other examples. Some techniques for dataset de-identification include data masking, data generalization, and data suppression.

SUMMARY

Some implementations described herein relate to a method. The method may include receiving, by a dataset evaluation system, a target dataset. The method may include pre-processing, by the dataset evaluation system, the target dataset to generate a normalized target dataset. The method may include processing, by the dataset evaluation system, the normalized target dataset with an intruder dataset to identify whether any quasi-identifiers are present in the normalized target dataset. The method may include determining, by the dataset evaluation system, a Cartesian product of the normalized target dataset and the intruder dataset. The method may include computing, by the dataset evaluation system and using a distance linkage disclosure technique, an inference risk score for the target dataset with the intruder dataset based on the Cartesian product and whether any quasi-identifiers are present in the normalized target dataset. The method may include outputting, by the dataset evaluation system, information associated with the inference risk score.

Some implementations described herein relate to a dataset evaluation system. The dataset evaluation system may include one or more memories and one or more processors coupled to the one or more memories. The one or more processors may be configured to receive a target dataset. The one or more processors may be configured to pre-process the target dataset to generate a normalized target dataset. The one or more processors may be configured to process the normalized target dataset with an intruder dataset to identify whether any quasi-identifiers are present in the normalized target dataset. The one or more processors may be configured to generate an anonymized dataset based on the normalized target dataset. The one or more processors may be configured to join the intruder dataset and the anonymized dataset to form a joined dataset. The one or more processors may be configured to determine a first Cartesian product of the anonymized dataset and the intruder dataset and a second Cartesian product of the joined dataset and the intruder dataset. The one or more processors may be configured to compute, using a distance linkage disclosure technique and based on whether any quasi-identifiers are present in the normalized target dataset, a first inference risk score for the target dataset with the intruder dataset with respect to the first Cartesian product and a second inference risk score for the target dataset and the intruder dataset with respect to the second Cartesian product. The one or more processors may be configured to compute a distance linkage variation value based on the first inference risk score and the second inference risk score. The one or more processors may be configured to output information associated with the first inference risk score and the second inference risk score.

Some implementations described herein relate to a non-transitory computer-readable medium that stores a set of instructions for wireless communication for a dataset evaluation system. The set of instructions, when executed by one or more processors of the dataset evaluation system, may cause the dataset evaluation system to receive an initial dataset. The set of instructions, when executed by one or more processors of the dataset evaluation system, may cause the dataset evaluation system to anonymize the initial dataset to generate a target dataset. The set of instructions, when executed by one or more processors of the dataset evaluation system, may cause the dataset evaluation system to pre-process the target dataset to generate a normalized target dataset. The set of instructions, when executed by one or more processors of the dataset evaluation system, may cause the dataset evaluation system to determine a Cartesian product of the normalized target dataset and an intruder dataset. The set of instructions, when executed by one or more processors of the dataset evaluation system, may cause the dataset evaluation system to compute, using a distance linkage disclosure technique, an inference risk score for the target dataset with the intruder dataset based on the Cartesian product. The set of instructions, when executed by one or more processors of the dataset evaluation system, may cause the dataset evaluation system to identify one or more compromised records based on the inference risk score. The set of instructions, when executed by one or more processors of the dataset evaluation system, may cause the dataset evaluation system to generate fuzzing data for the one or more compromised records. The set of instructions, when executed by one or more processors of the dataset evaluation system, may cause the dataset evaluation system to update the initial dataset with the fuzzing data. The set of instructions, when executed by one or more processors of the dataset evaluation system, may cause the dataset evaluation system to output information associated with the initial dataset based on updating the initial dataset.

BRIEF DESCRIPTION OF THE DRAWINGS

FIGS. 7-9 are flowcharts of example processes associated with using a dataset privacy management system.

DETAILED DESCRIPTION

Figure 1A:
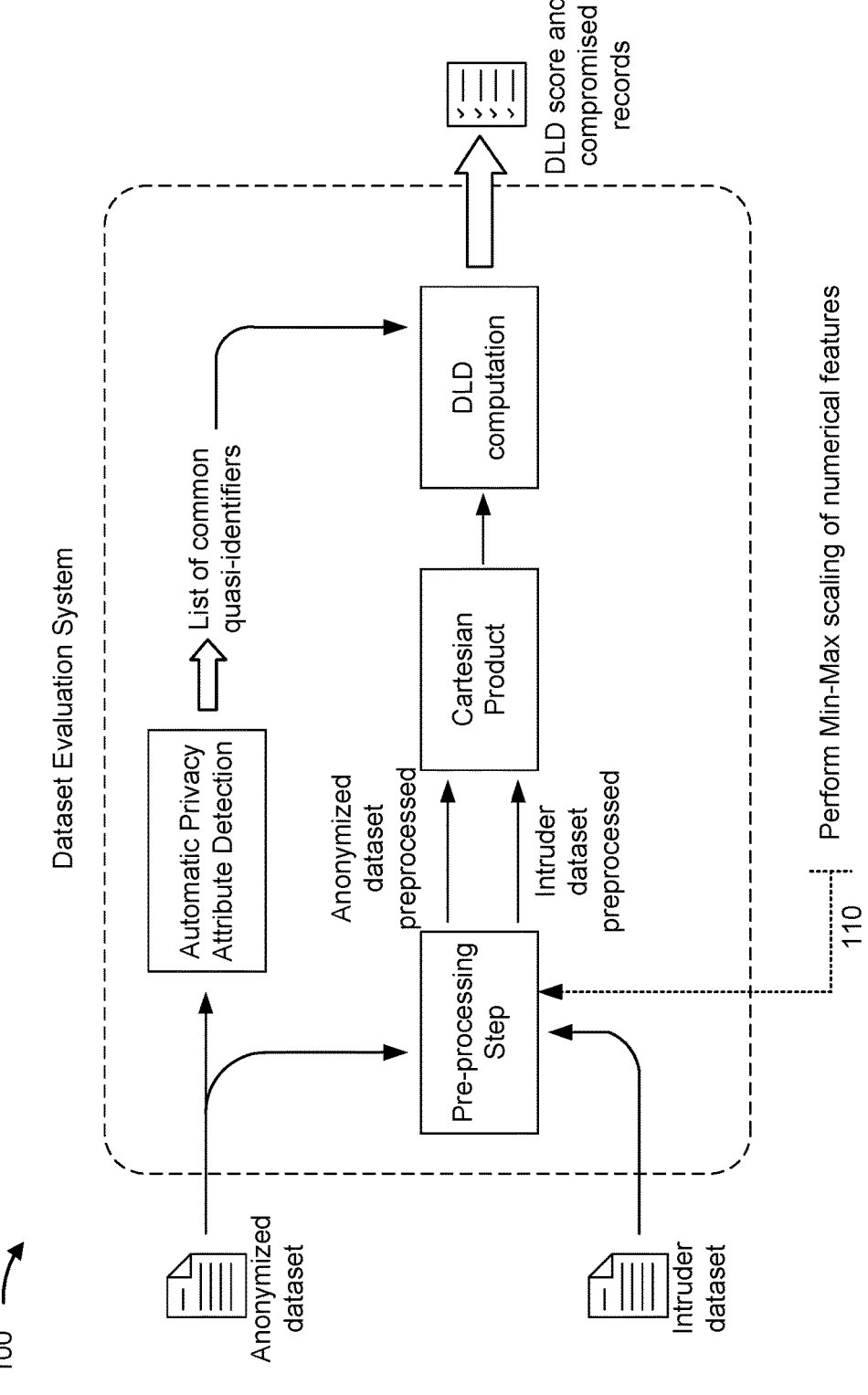
FIGS. 1A-1D are diagrams of an example implementation associated with inference risk assessment.

The following detailed description of example implementations refers to the accompanying drawings. The same reference numbers in different drawings may identify the same or similar elements.

Data masking includes removing direct identifiers (e.g., by data removal or data redaction) and replacing the direct identifiers with random values or unique keys (e.g., pseudonyms). For example, a patient name and address may be removed from medical information and replaced with a unique key value to enable different patients to be distinguished (e.g., by unique key) without any patients being identified by their real information. Similarly, in network analysis, a user equipment (UE) may be anonymized to have a unique key value to ensure that the network analysis does not allow for identifying the UE and a user thereof, thereby preserving privacy. Data generalization includes reducing a precision of data in a dataset by replacing a particular data value with a more general data value. For example, a date of birth in census data may be generalized from a particular day, month, and year to, for example, only a month and year. Similarly, a location of a UE may be generalized to a block, a cell tower radius, or a city. In this case, data can still be analyzed at the generalized level (e.g., UEs can be analyzed at cell tower level of specificity) without any particular individual within the generalized level (e.g., a UE being used in proximity to a particular cell tower) being identifiable. Data suppression includes removing records from a dataset, such as medical records for patients. For example, a patient medical record (e.g., including both personal identification information, such as a name, and non-personal identification information, such as a treatment) may be removed from a dataset.

However, data de-identification tools can be ineffective in some cases. For example, when a particular cell tower is located in an area with only a small quantity of UEs, generalizing network analysis data to the cell tower level may not adequately anonymize network traffic data for individuals using UEs in proximity to the particular cell tower. Similarly, when a patient name is redacted from a dataset, the patient may still be identifiable from other data within the dataset (e.g., other data that uniquely identifies the patient, such as an insurance coverer, an age, a set of treatments, an attending physician, etc.). In other words, although some data is anonymized, enough data may remain to uniquely identify an individual or other private information.

Additional data can be removed to avoid uniquely identifying any individual within a dataset; however, this may reduce a usefulness of the dataset by removing data entries that may be useful for analysis. Similarly, a record relating to an individual can be suppressed from the dataset; however, this may result in the dataset being skewed when records chosen for suppression are not randomly distributed with respect to attributes in the dataset. Moreover, when a first dataset is published for use by researchers, a second dataset may be available from a different source that can be cross-referenced with the first dataset. In other words, a first de-identified dataset of census data may be published by a first source, and a second de-identified dataset of consumer purchasing data may be published by a second source. Although both datasets are internally de-identified, cross-referencing the two datasets may reveal individuals (e.g., correlating data entries across datasets may enable identification of the individuals).

Accordingly, it may be desirable to be able to determine whether a dataset is properly de-identified as accurately as possible to ensure that the data in the dataset is de-identified to at least a threshold level to protect information privacy, without being overly de-identified, which can reduce a usefulness of the dataset. Furthermore, it may be desirable to be able to automatically cross-reference and correlate multiple datasets to determine if multiple datasets, in combination, are de-identified to at least a threshold level to protect information privacy.

Some implementations described herein provide a dataset evaluation system. The dataset evaluation system may analyze a data environment, which may include a dataset, other datasets that can be correlated with the dataset, updates to the dataset, republishing of the dataset, or recipients of the dataset, among other examples. The dataset evaluation system can determine whether data is de-identified to at least a threshold level to protect data privacy. By analyzing the data environment, rather than just the dataset itself, the dataset evaluation system reduces a likelihood of failing to de-identify data in a dataset as a result of, for example, weaknesses in de-identification techniques and/or the availability of other datasets for cross-referencing and correlation. Moreover, when the dataset evaluation system determines that a dataset is not de-identified to at least the threshold level, the dataset evaluation system can automatically apply additional data de-identification techniques and re-analyze the dataset (e.g., in an iterative process) until the dataset evaluation system determines that the data is de-identified to at least the threshold level. This may ensure data privacy while avoiding excess de-identification of data, which can skew analyses of the dataset.

FIGS. 1A-1D are diagrams of an example implementation 100 associated with inference risk assessment. As shown in FIGS. 1A-1D, example implementation 100 is performed by a dataset evaluation system. The dataset evaluation system is described in more detail below in connection with FIG. 5 and FIG. 6.

As further shown in FIG. 1A, in a first case in which there are common features across different input datasets and the dataset evaluation system does not have access to an original dataset, the dataset evaluation system may receive an anonymized dataset and an intruder dataset. The anonymized dataset may be a target dataset that the dataset evaluation system is to analyze to determine whether the anonymized dataset, when analyzed with the intruder dataset, is sufficiently anonymized such that personal or other private information of the anonymized dataset is not revealed. The intruder dataset may be another dataset that can be correlated with the anonymized dataset to attempt to reveal personal information. In this way, the dataset evaluation system can determine whether another actor would be able to use the intruder dataset to obtain personal information from the anonymized dataset that was not sufficiently anonymized.

In some implementations, the dataset evaluation system may determine whether there are common features across different input datasets and select a processing procedure based on whether there are common features across the different input datasets. For example, the dataset evaluation system may identify a set of types of data elements in the anonymized dataset and the intruder dataset and, if there are some types of data elements in common, the dataset evaluation system may evaluate the anonymized dataset using the procedures described herein with regard to FIGS. 1A-1D and 2A-2E. Alternatively, when there are not common features, the dataset evaluation system may evaluate the anonymized dataset using the procedure described herein with regard to FIGS. 3A-3C. Additionally, or alternatively, the dataset evaluation system may evaluate the anonymized dataset using a plurality of procedures described herein or a combination of steps of procedures described herein.

In some implementations, the dataset evaluation system may select the intruder dataset from a data environment of a target dataset (e.g., the anonymized dataset or the underlying, original dataset from which the anonymized dataset is derived). For example, when the target dataset relates to drug trial data, the dataset evaluation system may select a medical data dataset as an intruder dataset against which to evaluate anonymization of the drug trial data. Similarly, when the target dataset relates to first social media data, the dataset evaluation system may select second social media data as an intruder data set. In some implementations, the dataset evaluation system may select multiple intruder datasets. For example, the dataset evaluation system may perform an analysis of the target dataset against multiple, separate intruder datasets to determine whether the target dataset is sufficiently anonymized against any or all of the intruder datasets. Additionally, or alternatively, the dataset evaluation system may combine a set of possible intruder datasets into a single intruder dataset to determine whether the target dataset is sufficiently anonymized against correlation or other inference attacks with multiple datasets.

As a first example, an anonymized dataset may include a dataset of network traffic from UEs for which user identifiers have been removed and replaced with anonymous unique identifiers. In this first example, the intruder dataset may include a separate dataset of purchasing data from a seller of UEs (e.g., that includes user identification data). Although the anonymized dataset has had the user identifiers removed, by correlating other data in the anonymized dataset (e.g., when each UE was activated for the network) with data in the intruder dataset (e.g., when each UE was purchased), it may be possible to reveal identities of the users of the UEs from the user identification data in the intruder dataset. Accordingly, and as described herein, the dataset evaluation system may analyze the anonymized dataset with the intruder dataset to determine whether such a correlation is possible to reveal the anonymized user identifiers associated with users of the UEs.

As a second example, an anonymized dataset may include a first dataset of census data, from a first census, for which addresses have been removed and replaced with census tract identifiers. In this second example, the intruder dataset may include a separate, second dataset of census data, from a second census, for which the addresses have not been removed and replaced with census tract identifiers. In this case, it may be possible to correlate data in the two census datasets (e.g., dates of birth, numbers of children, professions, income levels, etc.) to reveal identities and addresses that were anonymized in the first dataset. Accordingly, and as described herein, the dataset evaluation system may analyze the anonymized dataset with the intruder dataset to determine whether such a correlation is possible to reveal the removed addresses and identities.

As further shown in FIG. 1A, and by reference number 110, the dataset evaluation system may perform a pre-processing step. For example, the dataset evaluation system may perform a normalization procedure, such as min-max scaling of numerical features of the anonymized dataset and/or the intruder dataset. In this case, the dataset evaluation system may scale variables of the anonymized dataset and/or the intruder dataset to have values in a range of, for example, 0 to 1. As one example, a first dataset of first salary data may list salary data on a per hour basis and a second dataset of second salary data may list the salary data on a per year basis. In this case, the dataset evaluation system may pre-process the first and second datasets to ensure that the salary data is comparable across the first and second dataset (e.g., by scaling each salary value to a value in a range of 0 to 1 rather than as a function of a time period). In another example, a first dataset of first population data may list records (of data regarding people) using census tracts and a second dataset of second population data may list records using zip codes. In this case, rather than normalizing to a value in a range of 0 to 1, the dataset evaluation system may select a single geographic scheme (e.g., census tracts, zip codes, states, countries, geographic coordinates, etc.) and normalize the datasets to both use the single geographic scheme. In this way, the dataset evaluation system generates a normalized target data set enables evaluation of variables on a common scale without modifying a distribution of values for each of the variables. Additionally, or alternatively, the dataset evaluation system may use another normalization or standardization procedure to account for different scales for similar variables.

Figure 1B:
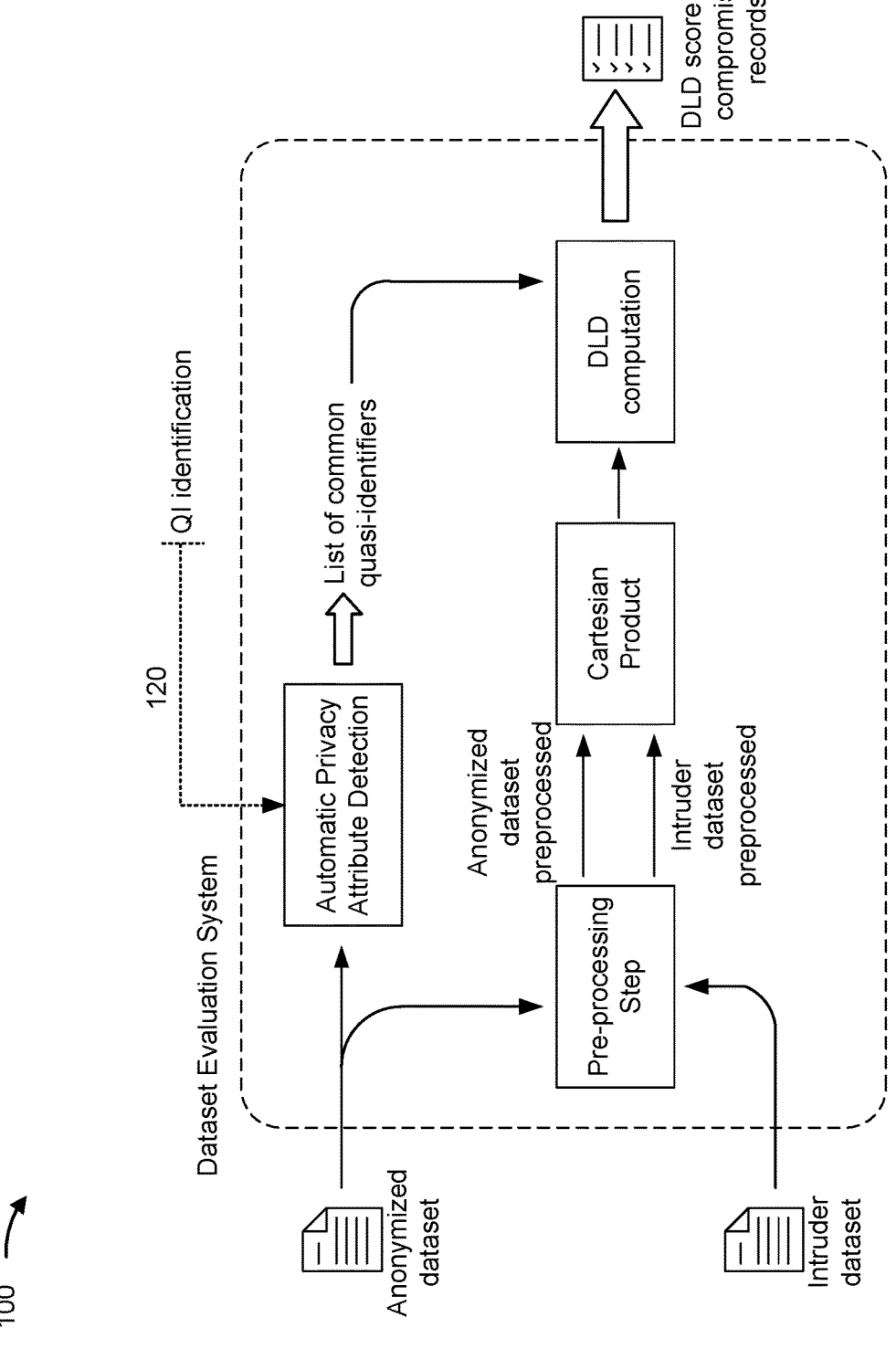

As shown in FIG. 1B, and by reference number 120, the dataset evaluation system may perform quasi-identifier (QI) identification. For example, the dataset evaluation system may use an automatic privacy attribute detection module to perform the QI identification. A QI may include an identifier that does not uniquely identify an individual (e.g., or does not uniquely identify more than a threshold percentage of individuals), but could, when combined with another quasi-identifier, uniquely identify an individual. For example, for an individual, a social security number may be an identifier, an age and a census tract may each be QIs, and a medical condition may be confidential or private information. Similarly, for a computing device, a medium access control (MAC) address may be an identifier, a device type may be a QI (e.g., multiple devices may have the same device type), and a user identify or browsing data may be confidential or private information. In some implementations, the dataset evaluation system may use one or more values-based algorithms to identify QIs in a tabular dataset (e.g., the anonymized dataset without pre-processing). For example, the dataset evaluation system may execute a singleton count algorithm and a functional dependency algorithm on the anonymized dataset. The singleton count algorithm may identify variables with only a single entry, which may be referred to as "singleton records". For example, the singleton count algorithm may identify a location variable with only a single person identified as being associated with a particular value for the location variable. The functional dependency algorithm may identify relationships between pairs of attributes, such that for every instance of a first attribute there is a value that unique identifies a corresponding value for a second attribute. For example, the dataset evaluation system may execute the functional dependency algorithm to determine whether a functional dependency is present with respect to a subset of records such that the records can be correlated to reveal private information. Using the singleton count algorithm and the functional dependency algorithm, the dataset evaluation system may identify QIs that are sufficiently well correlated with an entity (e.g., based on the entity being the only entity for a QI or based on a functional dependency based between the QI and the entity) that the QIs can be classified as identifiers. In this case, the dataset evaluation system may evaluate a performance of each algorithm, merge results, and output a set of identified QIs. Additionally, or alternatively, the dataset evaluation system may use other types of algorithms, such as a greedy algorithm, a cut-vertex algorithm, a separation minimum key algorithm, a distinct minimum key algorithm, or another type of algorithm.

Figure 1C:
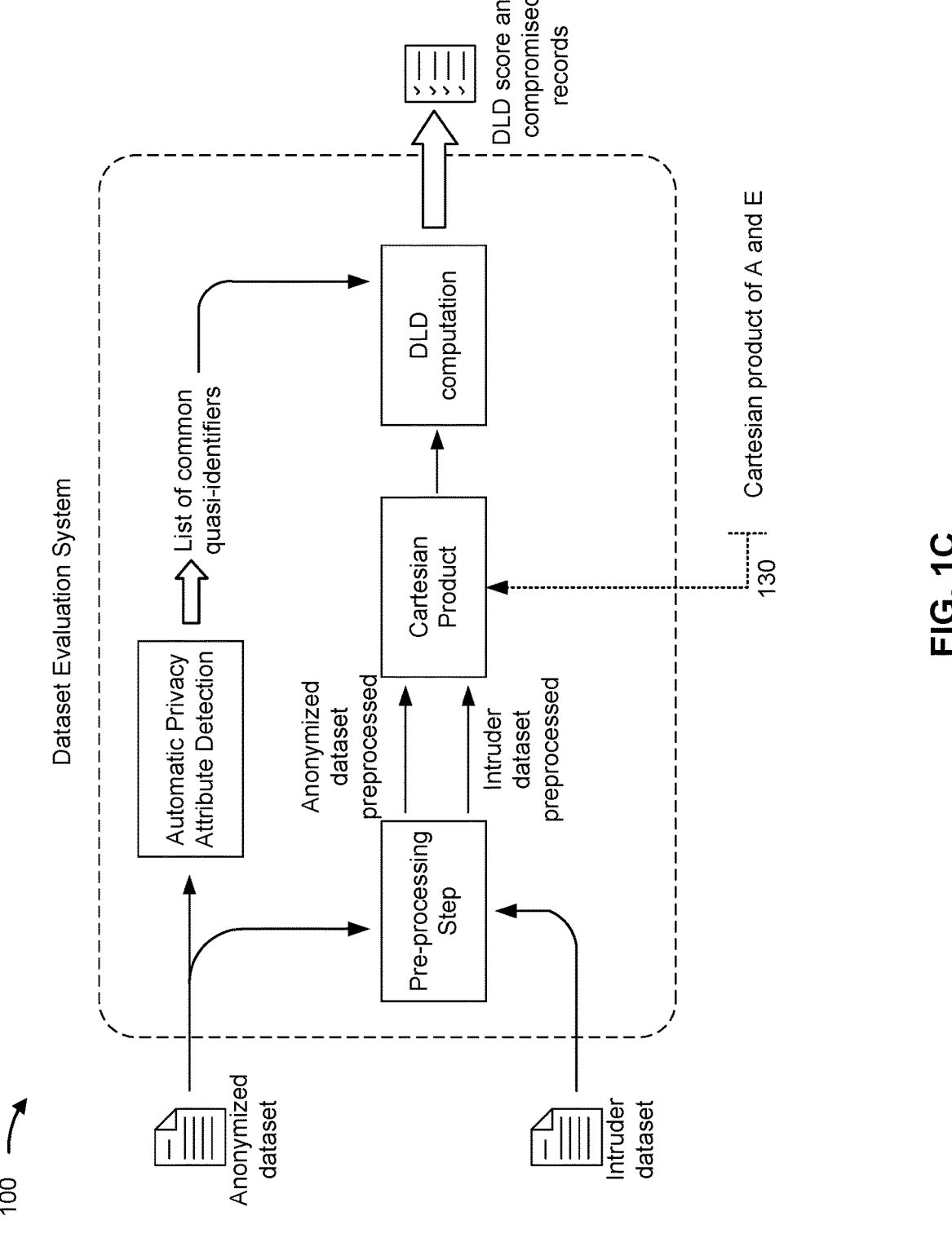

As shown in FIG. 1C, and by reference number 130, the dataset evaluation system may determine a Cartesian product of the anonymized dataset (A) and the intruder dataset (E) (e.g., after A and E are pre-processed). For example, the dataset evaluation system may generate a set of data element pairs (a, e) with a∈A and e∈E. In some implementations, in connection with performing a distance linkage disclosure technique, the dataset evaluation system may determine a distance between data elements in each data element pair. For example, the dataset evaluation system may determine a Euclidean distance between each a and each e for a∈A and e∈E in multi-dimensional space. In another example, the dataset evaluation system may not identify QIs common to both the anonymized dataset (or another target dataset) and the intruder dataset. In this case, rather than a Cartesian product or a distance linkage disclosure technique, as described below, the dataset evaluation system may use one or more other techniques for evaluating a target dataset and an intruder dataset, as also described below.

Figure 1D:
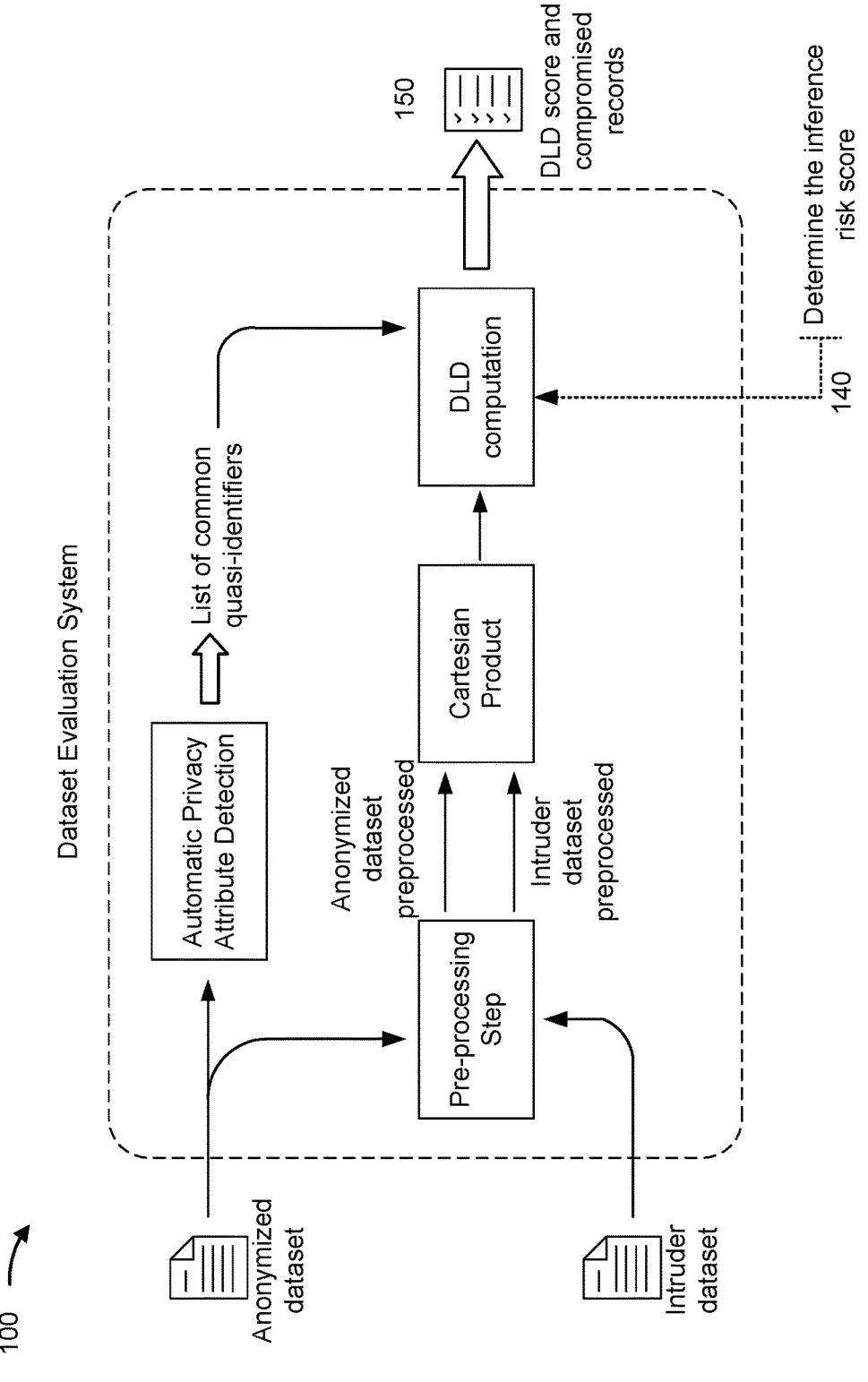

As shown in FIG. 1D, and by reference number 140, the dataset evaluation system may determine an inference risk score. For example, the dataset evaluation system may compute the inference risk score using a distance linkage disclosure (shown as "DLD" in FIG. 1D) technique. Additionally, or alternatively, the dataset evaluation system may compute the inference risk score using another technique.

As an example of the distance linkage disclosure technique, the dataset evaluation system may compute distances between records in a first dataset and a second dataset (e.g., an anonymized dataset or other target dataset and an intruder dataset) using Euclidian distance, such that for each record in the first dataset, the dataset evaluation system has computed a distance to every record in the second dataset. In this case, the dataset evaluation system may identify a subset (e.g., two or some other quantity) of nearest linked records (e.g., as a linked record, a linked to second nearest record, a linked to third nearest record, etc.). The dataset evaluation system may determine a distance linkage disclosure score based on a percentage of records identified as in the subset (e.g., a percentage of records categorized as a linked record, a linked to second nearest record, etc.). In this case, the distance linkage disclosure score may represent a composite distance between the first dataset and the second dataset (e.g., a combination of a linked record percentage and a linked to second nearest record percentage). The dataset evaluation system may generate a distance linkage disclosure score for each type of feature (e.g., numerical feature or categorical feature). When the score satisfies a threshold, the dataset evaluation system may classify the target dataset as insufficiently anonymized when combined with the intruder dataset.

The dataset evaluation system may use the set of identified QIs as an input to a distance linkage disclosure algorithm and determine the inference risk score based at least in part on the distance linkage disclosure algorithm and whether there are any QIs in a target dataset (e.g., the anonymized dataset or an original dataset from which the anonymized dataset is derived). In other words, the dataset evaluation system may determine a likelihood that a record, which includes some private information, can be uniquely attributed to a particular entity based at least in part on a similarity between values across different datasets and a presence of QIs that correlate to the particular entity (e.g., in one or more of the different datasets).

In this case, the dataset evaluation system may identify and mark nearest records (e.g., to QIs using the above-mentioned Euclidean distances) as first order linked or "linked" and second nearest records second order linked or "linked to second nearest." The dataset evaluation system may calculate a distance linkage disclosure as a percentage of records marked as linked or linked to second nearest. Additionally, or alternatively, the dataset evaluation system may calculate the distance linkage disclosure as a percentage of records marked only as linked or marked with another order of linkage. The dataset evaluation system may determine a disclosure risk, which may also be referred to as an "inference risk" or a "risk to inference attack" as a metric related to the distance linkage disclosure for one or more possible intruder datasets.

As further shown in FIG. 1D, and by reference number 150, the dataset evaluation system may output information identifying the inference risk score and/or one or more compromised records. For example, the dataset evaluation system may indicate whether the inference risk score satisfies a threshold indicating that the anonymized dataset has been sufficiently anonymized, when correlated with the intruder dataset, that the anonymized data therein is not revealed by correlation with the intruder dataset. Additionally, or alternatively, the dataset evaluation system may indicate one or more records (e.g., data elements within the anonymized dataset) that are compromised. In this case, a compromised record may include a record that can be correlated from the anonymized dataset with the intruder dataset, such that information included in the compromised record is revealed. In other words, if a record is related to a unique identifier of a particular UE, the dataset evaluation system may output the record as a compromised record based on determining that the user of the UE is revealed when the anonymized dataset is correlated with the intruder dataset. Similarly, if a record is related to an address and identity of a census subject, the dataset evaluation system may output the record as a compromised record based on determining the address and identity of the census subject by correlation with the intruder dataset with a threshold degree of certainty.

In some implementations, the dataset evaluation system may alter the anonymized dataset based on the inference risk score. For example, the dataset evaluation system may apply a de-identification technique to the anonymized dataset and/or to the compromised records thereof to further anonymize the anonymized dataset. As one example, the dataset evaluation system may generate fuzzing data and add the fuzzing data to the anonymized dataset (e.g., the fuzzing data may include invalid or unexpected data to further de-identify data). For example, the dataset evaluation system may generate one or more fake records for a particular location to avoid real records for the particular location being correlated to the people that the real records represent. In this case, the dataset evaluation system may use statistical techniques to generate the fake records to avoid causing unnecessary skewing of any analysis performed that includes the fake records. Additionally, or alternatively, the dataset evaluation system may alter data or further anonymize data be grouping the data at a different level of abstraction.

Based on applying a de-identification technique, the dataset evaluation system may re-evaluate the anonymized dataset (e.g., using an iterative process) until the dataset evaluation system does not detect any compromised records or calculates an inference risk score that satisfies a threshold. Based on identifying an anonymized dataset that satisfies the threshold (e.g., the original anonymized dataset or an updated anonymized dataset with one or more de-identification techniques applied), the dataset evaluation system may output the anonymized dataset for use or include the anonymized dataset in some other evaluation being performed by the dataset evaluation system or another system. For example, the dataset evaluation system may use an anonymized dataset of network traffic for network evaluation and efficiently allocating network resources based on determining that the anonymized dataset has an inference risk assessment score that satisfies a threshold.

In some implementations, the dataset evaluation system may output a certification of a dataset. For example, based on determining that the inference risk score of an initial or target dataset, the dataset evaluation system may certify that the initial or target dataset is sufficiently de-identified for public release. Additionally, or alternatively, the dataset evaluation system may certify a dataset after removing or modifying one or more records in the dataset, as described above. In some implementations, the dataset evaluation system may classify a dataset based on an inference risk assessment score. For example, the dataset evaluation system may classify a first dataset with a first score as being a highest level of de-identified and a second dataset with a second score as being a lower level of de-identified. In this case, the dataset evaluation system may control a set of permissions regarding which people or devices are granted access to the datasets based on the classifications. In other words, the first dataset, with the highest level of de-identification, may be available to a group of users and the second dataset, with the lower level of de-identification, may be available to only a sub-group of the group of users to avoid inadvertent disclosure of private information. In this case, the dataset evaluation system may communicate with a permissions management function to control which users are granted access to which datasets based on which levels of classification the dataset evaluation system has applied.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

FIGS. 2A-2E are diagrams of an example implementation 200 associated with inference risk assessment. As shown in FIGS. 2A-2E, example implementation 200 includes a dataset evaluation system. The dataset evaluation system is described in more detail below in connection with FIG. 5 and FIG. 6.

Figure 2A:
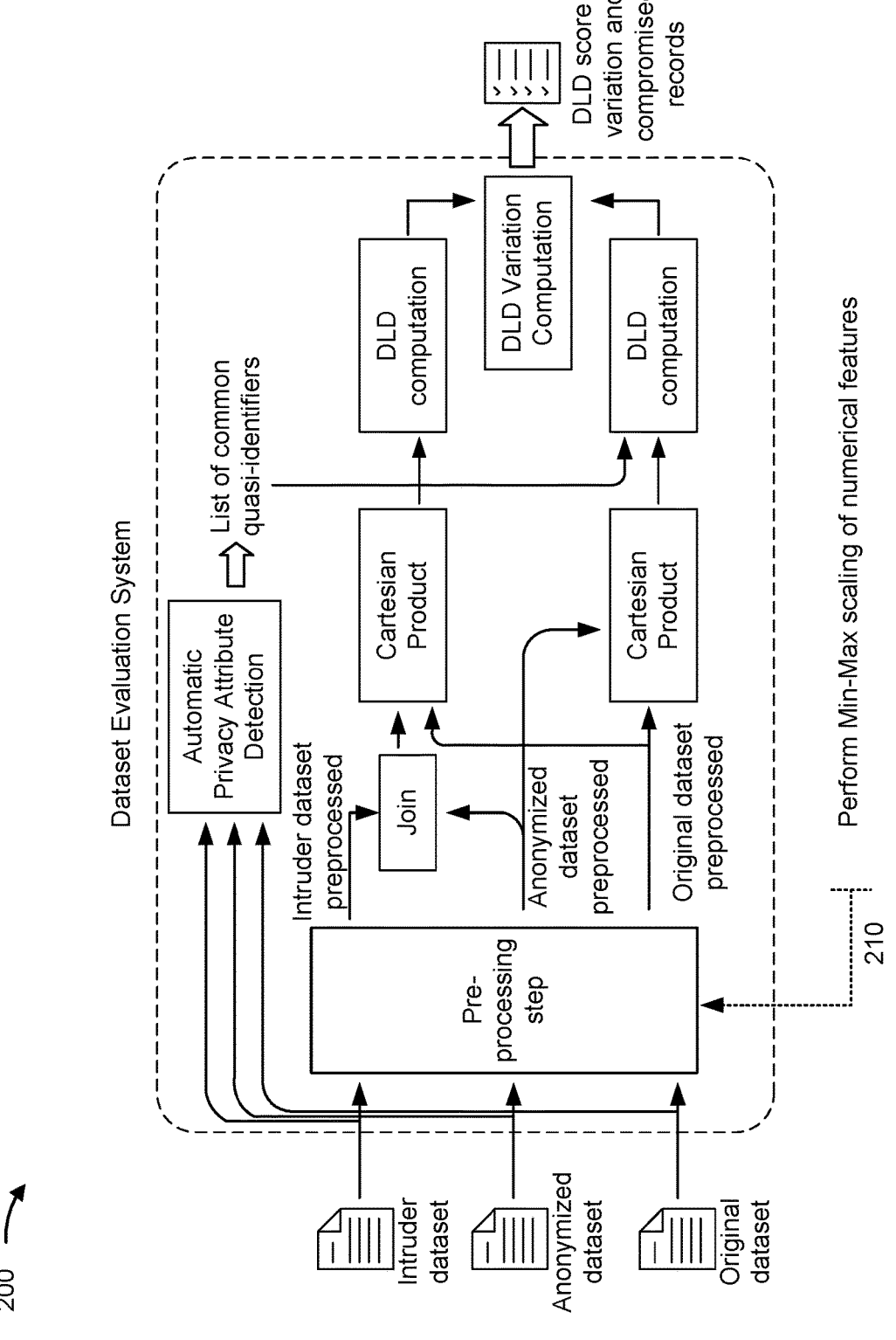
FIGS. 2A-2E are diagrams of an example implementation associated with inference risk assessment.

As further shown in FIG. 2A, in a second case in which there are common features across the different datasets and the dataset evaluation system does have access to an original dataset, the dataset evaluation system may receive an anonymized dataset, an intruder dataset, and an original dataset. The original dataset may be a first dataset to which a de-identification procedure is applied (e.g., by the dataset evaluation system or another device) to generate the anonymized dataset. Accordingly, in some implementations, the dataset evaluation system may receive the original dataset and the intruder dataset and may apply a set of de-identification procedures to records and associated data elements of the original dataset to generate the anonymized dataset.

As further shown in FIG. 2A, and by reference number 210, the dataset evaluation system may perform a pre-processing step, as described in more detail above. For example, the dataset evaluation system may perform min-max scaling of numerical features of the anonymized dataset, the original dataset, and/or the intruder dataset. In this case, the dataset evaluation system may scale variables of the anonymized dataset, the original dataset, and/or the intruder dataset to have values in a range of, for example, 0 to 1. Additionally, or alternatively, the dataset evaluation system may perform a different type of scaling (e.g., other than or in addition to min-max scaling) or may forgo scaling, normalization, or standardization in some implementations. In some aspects, the dataset evaluation system may generate the anonymized dataset after pre-processing the original dataset. For example, the dataset evaluation system may normalize the original dataset and generate a normalized, anonymized dataset from the normalized, original dataset.

Figure 2B:
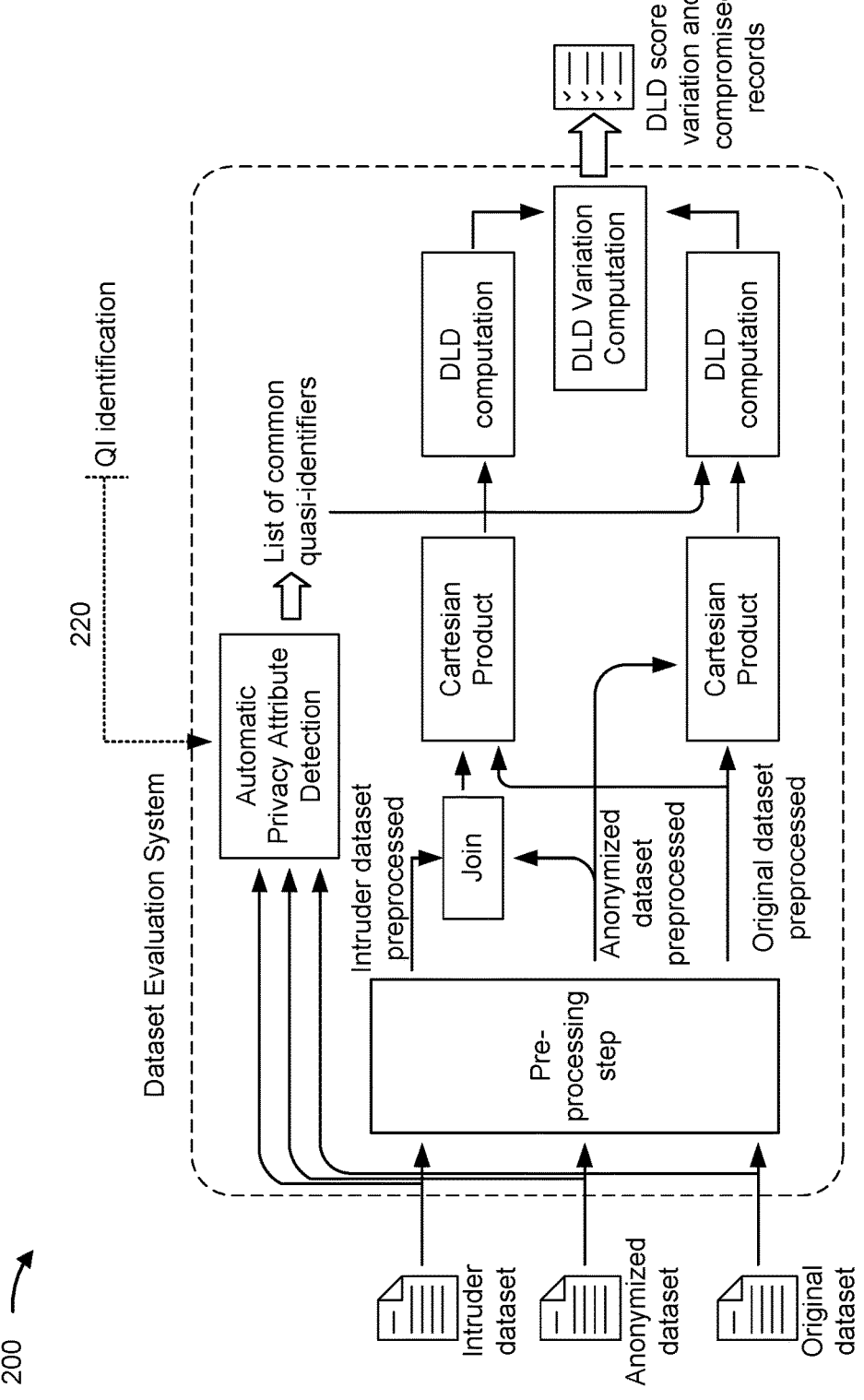

As shown in FIG. 2B, and by reference number 220, the dataset evaluation system may perform QI identification, as described in more detail above. For example, the dataset evaluation system may use an automatic privacy attribute detection module to perform the QI identification on the intruder dataset, the anonymized dataset, and/or the original dataset.

Figure 2C:
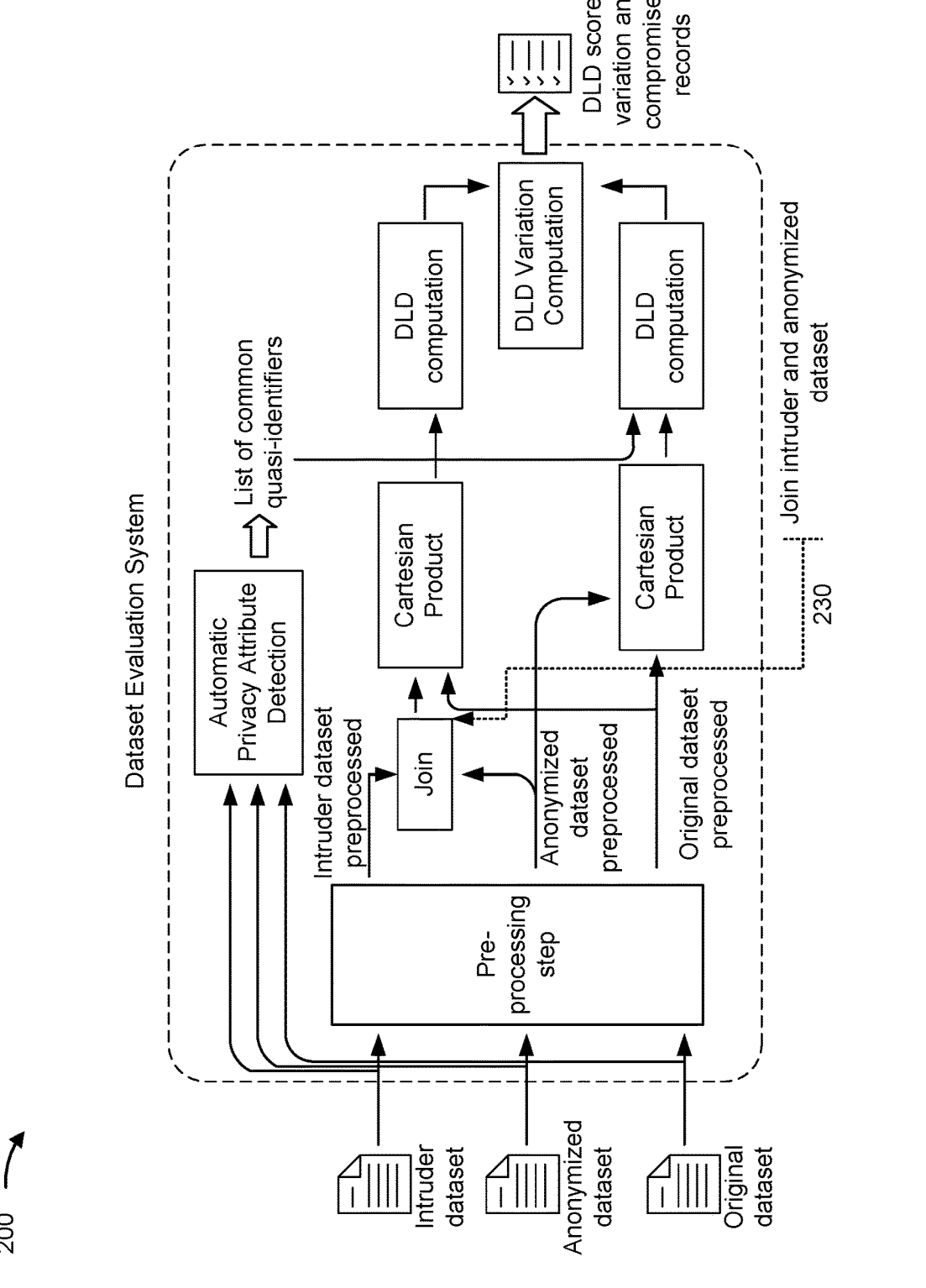

As shown in FIG. 2C, and by reference number 230, the dataset evaluation system may join the intruder dataset and the anonymized dataset to generate a joined dataset. For example, the dataset evaluation system may, after pre-processing the intruder dataset and the anonymized dataset, generate a joined dataset that includes records and associated data elements from both the intruder dataset and the anonymized dataset.

Figure 2D:
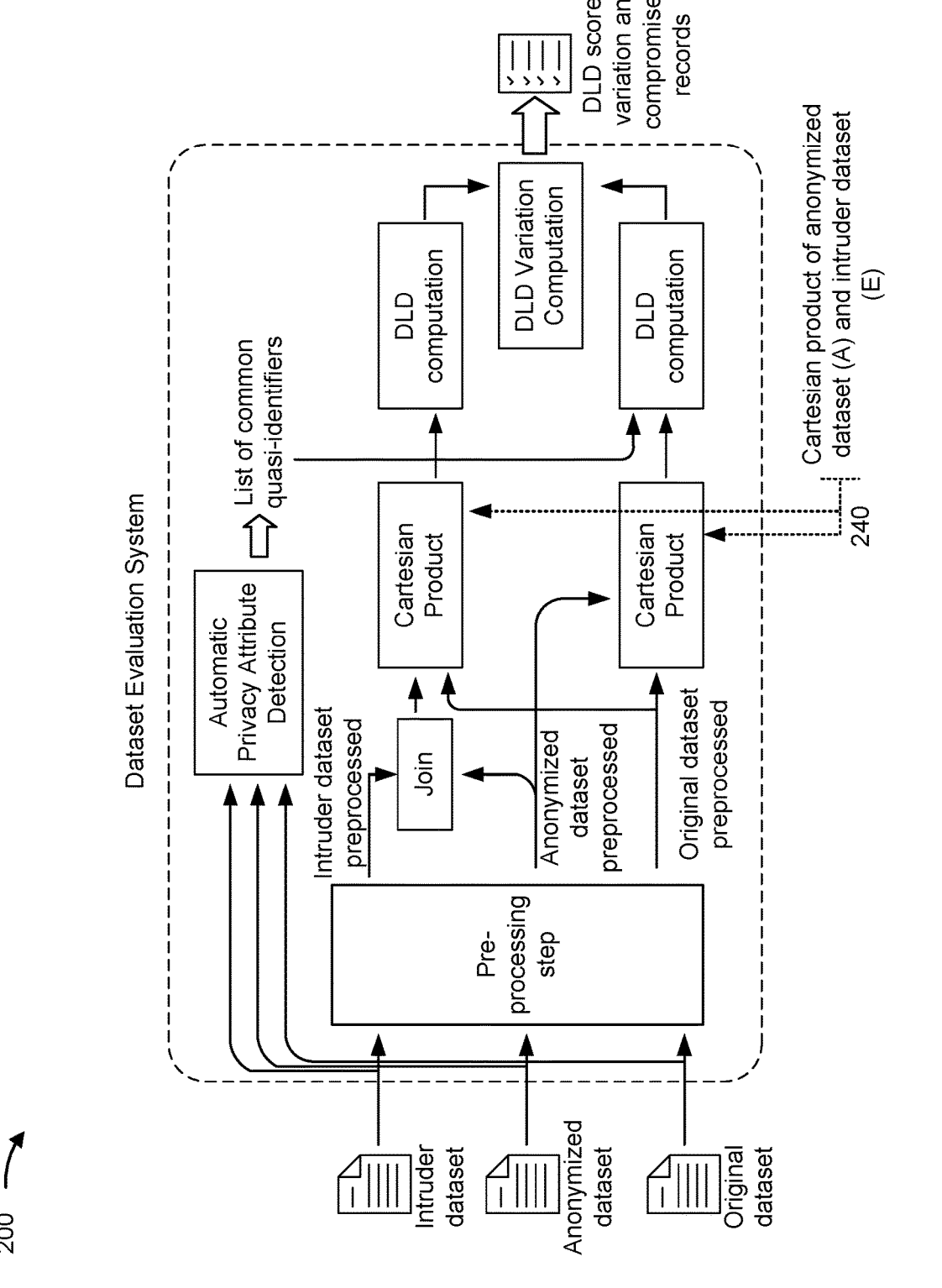

As shown in FIG. 2D, and by reference number 240, the dataset evaluation system may determine a first Cartesian product of the anonymized dataset (A) and an original dataset (O) (e.g., after A and O are pre-processed), as described in more detail above. For example, the dataset evaluation system may generate a first set of data element pairs (a, o) with $a \in A$ and $o \in O$. Similarly, the dataset evaluation system may determine a second Cartesian product of the joined dataset (J) and the original dataset (O). For example, the dataset evaluation system may generate a second set of data element pairs (j, o) with $j \in J$ and $o \in O$.

Figure 2E:
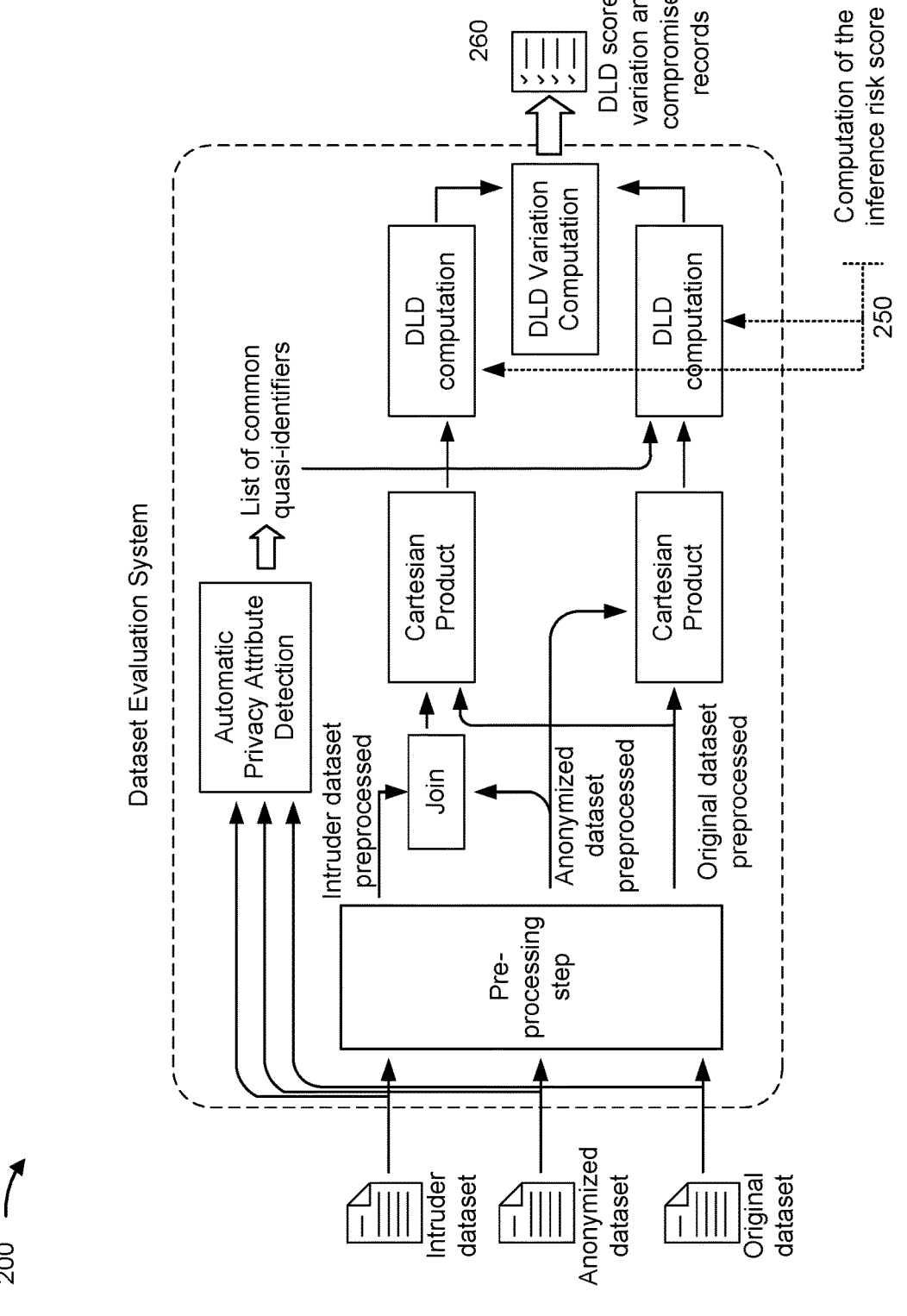

As shown in FIG. 2E, and by reference number 250, the dataset evaluation system may determine an inference risk score, as described in more detail above. For example, the dataset evaluation system may compute the inference risk score using a distance linkage disclosure technique applied to the first set of data element pairs and the second set of data element pairs. In this case, the dataset evaluation system may combine a first result of a first distance linkage disclosure computation (e.g., from the first set of data element pairs) with a second result of a second distance linkage disclosure computation (e.g., from the second set of data element pairs) using a distance linkage disclosure variation computation. For example, the dataset evaluation system may determine an amount by which distance linkage disclosure computations vary between using an original dataset compared with an anonymized dataset and an original dataset compared with a joining of the anonymized dataset and the intruder dataset.

As further shown in FIG. 2E, and by reference number 260, the dataset evaluation system may output information identifying the inference risk score and/or one or more compromised records, as described in more detail above. For example, the dataset evaluation system may indicate whether an inference risk score associated with the distance linkage disclosure variation computation satisfies a threshold indicating that the anonymized dataset has been sufficiently anonymized, when correlated with the intruder dataset, that the anonymized data therein is not revealed by correlation with the intruder dataset. Additionally, or alternatively, the dataset evaluation system may indicate one or more records (e.g., data elements within the anonymized dataset) that are compromised.

As indicated above, FIGS. 2A-2E are provided as an example. Other examples may differ from what is described with regard to FIGS. 2A-2E. The number and arrangement of devices shown in FIGS. 2A-2E are provided as an example. In practice, there may be additional devices, fewer devices, different devices, or differently arranged devices than those shown in FIGS. 2A-2E. Furthermore, two or more devices shown in FIGS. 2A-2E may be implemented within a single device, or a single device shown in FIGS. 2A-2E may be implemented as multiple, distributed devices. Additionally, or alternatively, a set of devices (e.g., one or more devices) shown in FIGS. 2A-2E may perform one or more functions described as being performed by another set of devices shown in FIGS. 2A-2E.

Figure 3A:
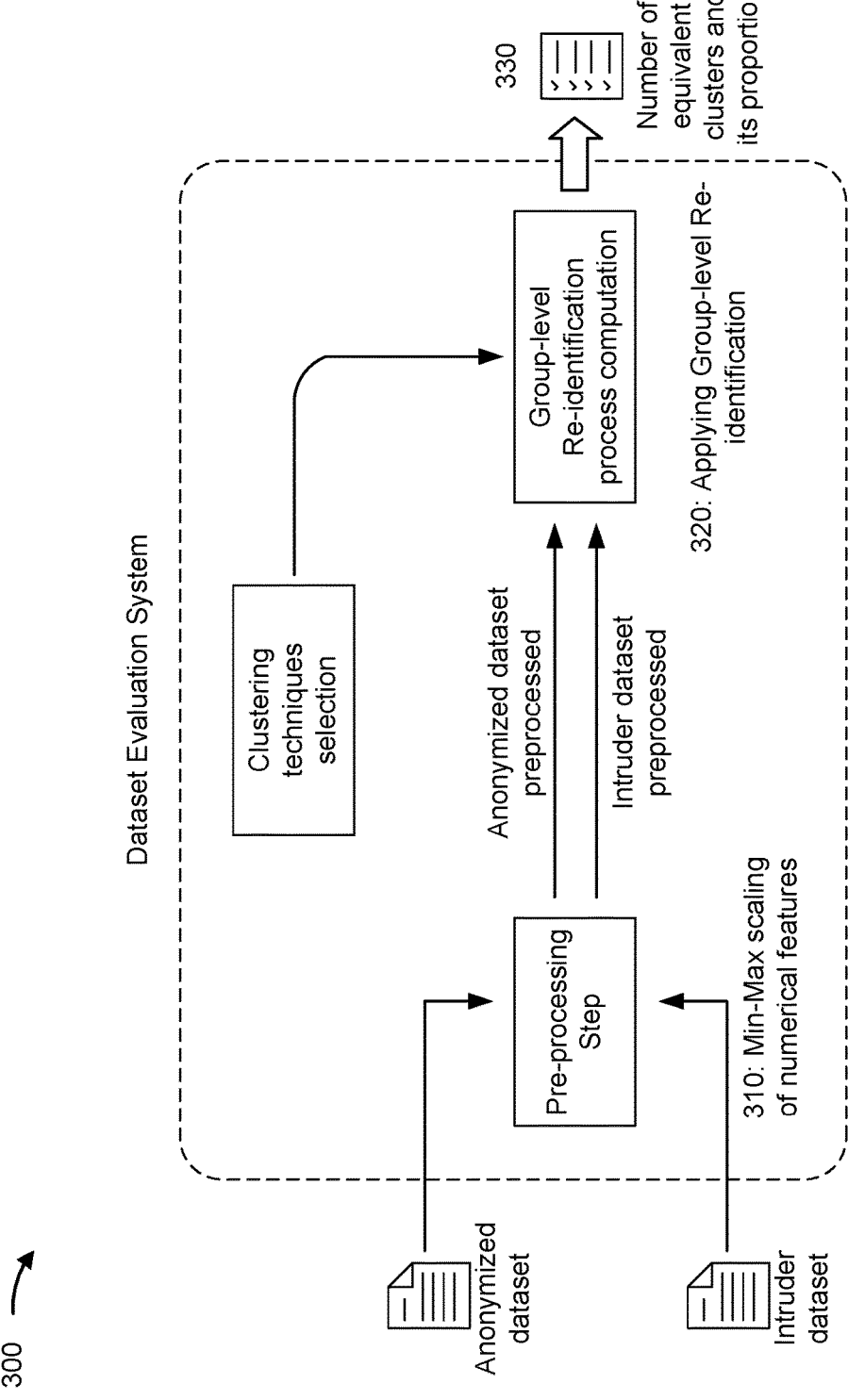
FIGS. 3A-3C are diagrams of an example implementation associated with cluster analysis.
Figure 3B:
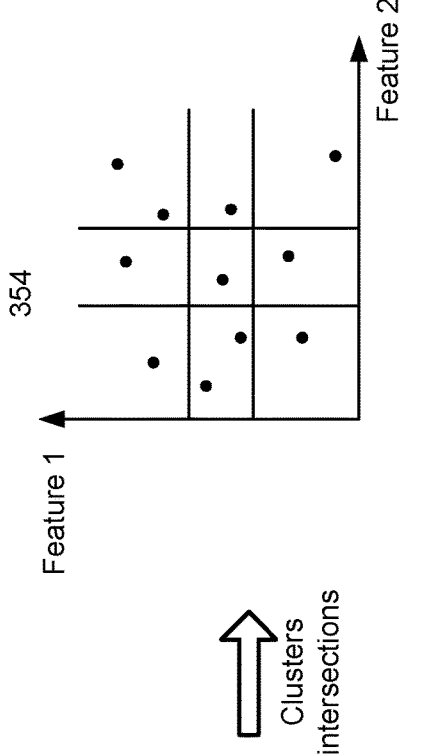
Figure 3B:
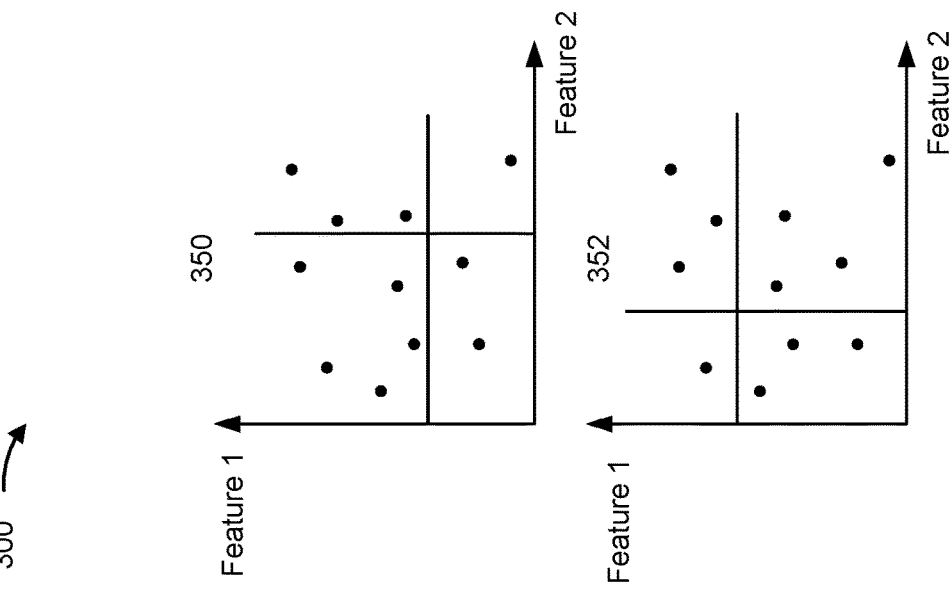
Figure 3C:
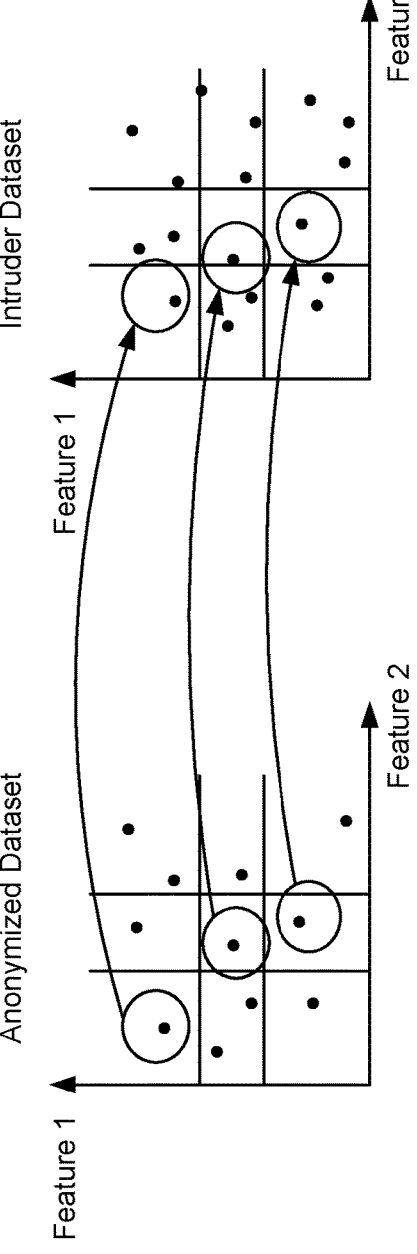

FIGS. 3A-3C are diagrams of an example implementation 300 associated with cluster analysis. As shown in FIGS. 3A-3C, example implementation 300 includes a dataset evaluation system. The dataset evaluation system is described in more detail below in connection with FIG. 5 and FIG. 6.

As further shown in FIG. 3A, in a third case in which there are not common features across the different datasets, the dataset evaluation system may receive an anonymized dataset and an intruder dataset, as described in more detail above. As further shown in FIG. 3A, and by reference number 310, the dataset evaluation system may perform a pre-processing step, as described in more detail above. For example, the dataset evaluation system may perform min-max scaling of numerical features of the anonymized dataset and/or the intruder dataset. In this case, the dataset evaluation system may scale variables of the anonymized dataset and/or the intruder dataset to have values in a range of, for example, 0 to 1.

As further shown in FIG. 3A, and by reference number 320, the dataset evaluation system may perform a group-level re-identification process. For example, the dataset evaluation system may select a set of clustering techniques and may use the set of clustering techniques to apply group-level re-identification on the anonymized dataset and the intruder dataset (e.g., after pre-processing) without crossing data between the anonymized dataset and the intruder dataset. In other words, as described below, the dataset evaluation system may generate a set of clusters for a first dataset, attempt to apply the set of clusters to a second dataset, and determine if one or more clusters of the set of clusters can be successfully, equivalently applied to the second dataset with a threshold accuracy.

FIG. 3B shows an example of applying clusters to datasets. For example, as shown by reference number 350, the dataset evaluation system may identify (e.g., using a set of clustering techniques) a first cluster for a representation of data elements of the anonymized dataset and with respect to a first feature and a second feature. Similarly, as shown by reference number 352, the dataset evaluation system may identify a second cluster for the representation of data elements of the anonymized dataset and with respect to the first feature and the second feature. As shown by reference number 354, the dataset evaluation system may determine an intersection of the first cluster and the second cluster. The dataset evaluation system may apply the same set of clustering techniques to the intruder dataset to determine intersections of different clusters for the intruder dataset. Based on identifying the clusters, the dataset evaluation system may form a data structure for joint evaluation of multiple datasets (e.g., a table with columns representing cluster numbers and rows representing the set of clustering techniques used to generate the clusters).

FIG. 3C shows an example of cross-applying clusters across datasets. For example, the dataset evaluation system may apply the intersections of the clusters from the anonymized dataset to the intruder dataset (or vice versa). In this case, the dataset evaluation system may attempt to identify equivalent records in both datasets. An equivalent record may include a record that is within the same partition in both datasets, thereby enabling re-identification (e.g., identification despite anonymization). For example, the top-left cluster in the anonymized dataset has only a single data element and, when the clusters are applied to the intruder dataset, a single data element is also present in the top-left cluster. Accordingly, the dataset evaluation system may conclude that the data element in the anonymous dataset and the intruder dataset are related to equivalent records and that the cluster that includes the data element is an equivalent cluster, as described above. In some implementations, the dataset evaluation system may apply group-level identification to identify records that have a common quantity of matching clusters for each of the applied clustering techniques. In this case, the dataset evaluation system may determine that one or more records are subject to an inference risk, as described above.

Returning to FIG. 3A, and as shown by reference number 330, the dataset evaluation system may provide output indicating a quantity of equivalent clusters, a proportion of equivalent clusters to non-equivalent clusters, a score based on the proportion, or a set of compromised records (e.g., records that cluster into the equivalent clusters), among other examples. In some implementations, the dataset evaluation system may apply one or more data de-identification procedures to the anonymized dataset and perform another evaluation of the anonymized dataset (e.g., until the dataset evaluation system determines that there are fewer than a threshold quantity or less than a threshold proportion of equivalent clusters).

As indicated above, FIGS. 3A-3C are provided as an example. Other examples may differ from what is described with regard to FIGS. 3A-3C. The number and arrangement of devices shown in FIGS. 3A-3C are provided as an example. In practice, there may be additional devices, fewer devices, different devices, or differently arranged devices than those shown in FIGS. 3A-3C. Furthermore, two or more devices shown in FIGS. 3A-3C may be implemented within a single device, or a single device shown in FIGS.

3A-3C may be implemented as multiple, distributed devices. Additionally, or alternatively, a set of devices (e.g., one or more devices) shown in FIGS. 3A-3C may perform one or more functions described as being performed by another set of devices shown in FIGS. 3A-3C.

Figure 4:
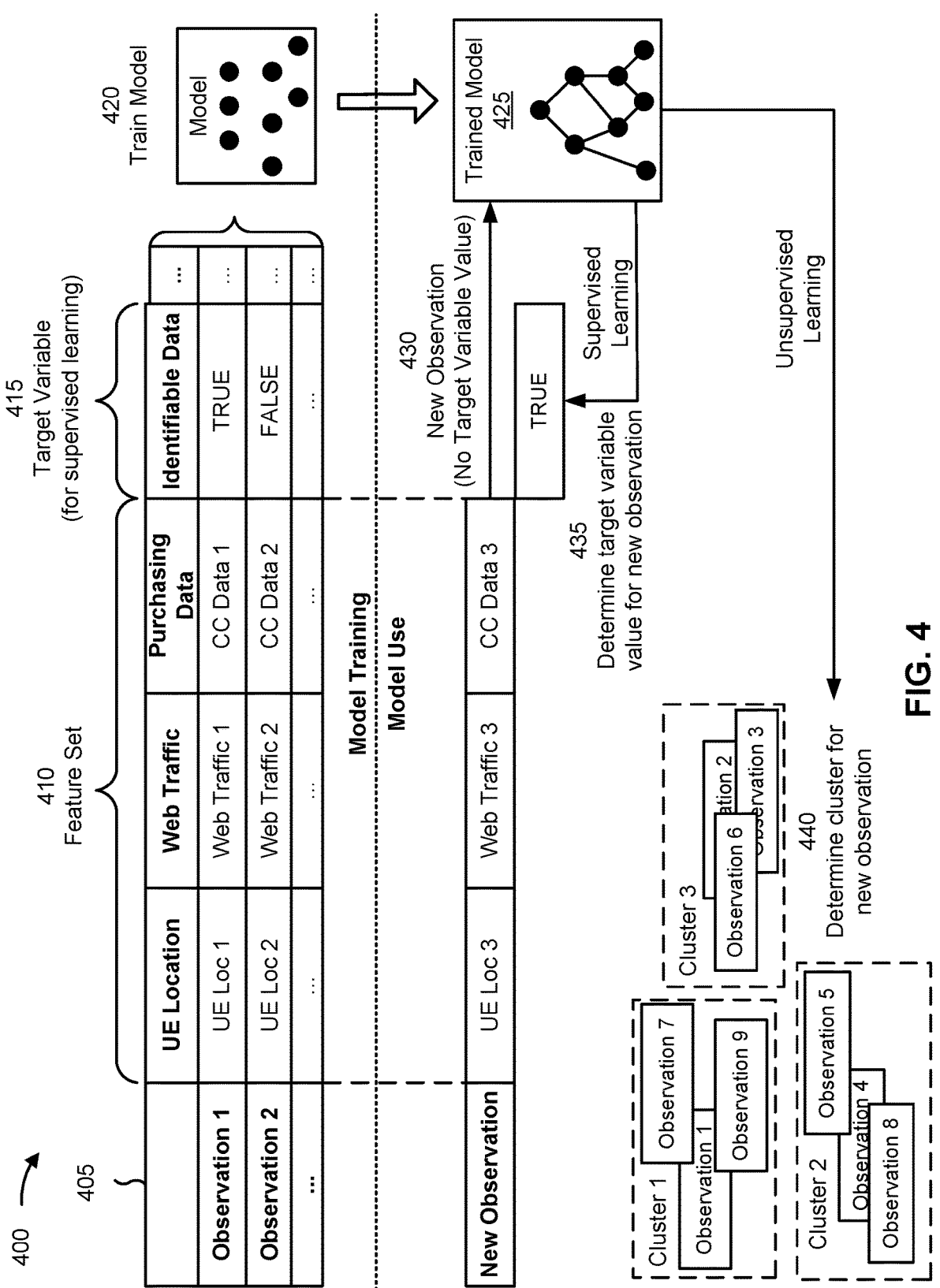
FIG. 4 is a diagram illustrating an example of training and using a machine learning model in connection with dataset evaluation system.

FIG. 4 is a diagram illustrating an example 400 of training and using a machine learning model in connection with dataset evaluation system. The machine learning model training and usage described herein may be performed using a machine learning system. The machine learning system may include or may be included in a computing device, a server, a cloud computing environment, or the like, such as the dataset evaluation system 501 described in more detail elsewhere herein.

As shown by reference number 405, a machine learning model may be trained using a set of observations. The set of observations may be obtained from training data (e.g., historical data), such as data gathered during one or more processes described herein. In some implementations, the machine learning system may receive the set of observations (e.g., as input) from client device 530 and/or data source 540, as described elsewhere herein.

As shown by reference number 410, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from client device 530 and/or data source 540. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of a UE location dataset, a second feature of a web traffic data dataset, a third feature of a purchasing data dataset, and so on. As shown, for a first observation, the first feature may have a value of UE Loc 1, the second feature may have a value of Web Traffic 1, the third feature may have a value of CC Data 1, and so on. These features and feature values are provided as examples, and may differ in other examples. For example, the feature set, in this particular case of an analysis of UEs to, for example, determine an amount of predicted data traffic and an associated set of network resources to allocate for the predicted data traffic, may include one or more of the following features: a UE type dataset, a UE mobility dataset, or a user profile dataset, among other examples.

As shown by reference number 415, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 400, the target variable is whether personal identifiable data can be determined from the dataset, which has a value of True for the first observation.

The feature set and target variable described above are provided as examples, and other examples may differ from what is described above. For example, for a target variable of whether an individual is identifiable in a medical data set, the feature set may include data from a first dataset (e.g., demographic data), data from a second dataset (e.g., treatment data), data from a third dataset (e.g., drug trial data), among other examples. Although some implementations are described in terms of determining whether or not an individual or other entity is identifiable, other implementations, such as scoring a level of identifiability of one or more entities associated with a dataset, are contemplated.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 420, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. For example, the machine learning system may use a regression algorithm to score a likelihood that an entity associated with a first dataset is identifiable when the first dataset is cross-correlated with a second dataset. Additionally, or alternatively, the machine learning system may use a k-nearest neighbor algorithm or a support vector machine algorithm to generate a set of clusters associated with a first dataset and apply the set of clusters to a second dataset to determine whether entities are de-identified to a threshold level for the first dataset when cross-correlated with the second dataset. After training, the machine learning system may store the machine learning model as a trained machine learning model 425 to be used to analyze new observations.

As an example, the machine learning system may obtain training data for the set of observations based on searching for available datasets. For example, the machine learning system may receive datasets that have differing levels of de-identification techniques applied. In this case, the datasets may be artificially generated datasets (e.g., datasets collected and de-identified specifically for training the machine learning system) or naturally generated datasets (e.g., existing datasets for which different levels of de-identification are determinable).

As shown by reference number 430, the machine learning system may apply the trained machine learning model 425 to a new observation, such as by receiving a new observation and inputting the new observation to the trained machine learning model 425. As shown, the new observation may include a first feature of a UE location, a second feature of web traffic data, a third feature of purchasing data, and so on, as an example. The machine learning system may apply the trained machine learning model 425 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 425 may predict a value of true for the target variable of whether personal identifiable data is present in a dataset for the new observation, as shown by reference number 435. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, withholding the dataset from dissemination. The first automated action may include, for example, applying a de-identification technique to the dataset before dissemination of the dataset.

As another example, if the machine learning system were to predict a value of false for the target variable of whether there is personal identifiable data in present in the dataset, then the machine learning system may provide a second (e.g., different) recommendation (e.g., to allow dissemination of the dataset) and/or may perform or cause performance of a second (e.g., different) automated action (e.g., publishing of the dataset to an archive).

In some implementations, the trained machine learning model 425 may classify (e.g., cluster) the new observation in a cluster, as shown by reference number 440. The observations within a cluster may have a threshold degree of similarity. As an example, if the machine learning system classifies the new observation in a first cluster and cross-correlates the first cluster with another dataset, as described above, then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster and be unable to cross-correlate the second cluster with another dataset, then the machine learning system may provide a second (e.g., different) recommendation (e.g., that a first dataset is sufficiently de-identified in light of the second dataset) and/or may perform or cause performance of a second (e.g., different) automated action, such as disseminating the first dataset.

In some implementations, the recommendation and/or automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 425 may be re-trained using feedback information. For example, feedback may be provided to the machine learning model. The feedback may be associated with actions performed based on the recommendations provided by the trained machine learning model 425 and/or automated actions performed, or caused, by the trained machine learning model 425. In other words, the recommendations and/or actions output by the trained machine learning model 425 may be used as inputs to re-train the machine learning model (e.g., a feedback loop may be used to train and/or update the machine learning model). For example, the feedback information may include new datasets or differently de-identified datasets.

In this way, the machine learning system may apply a rigorous and automated process to analyzing datasets for whether personal information is de-identified to protect privacy and/or anonymity. The machine learning system may enable recognition and/or identification of tens, hundreds, thousands, or millions of features and/or feature values for tens, hundreds, thousands, or millions of observations, thereby increasing accuracy and consistency and reducing delay associated with using datasets relative to requiring computing resources to be allocated for tens, hundreds, or thousands of operators to manually cross-correlate data entries between different datasets using the features or feature values.

As indicated above, FIG. 4 is provided as an example. Other examples may differ from what is described in connection with FIG. 4.

Figure 5:
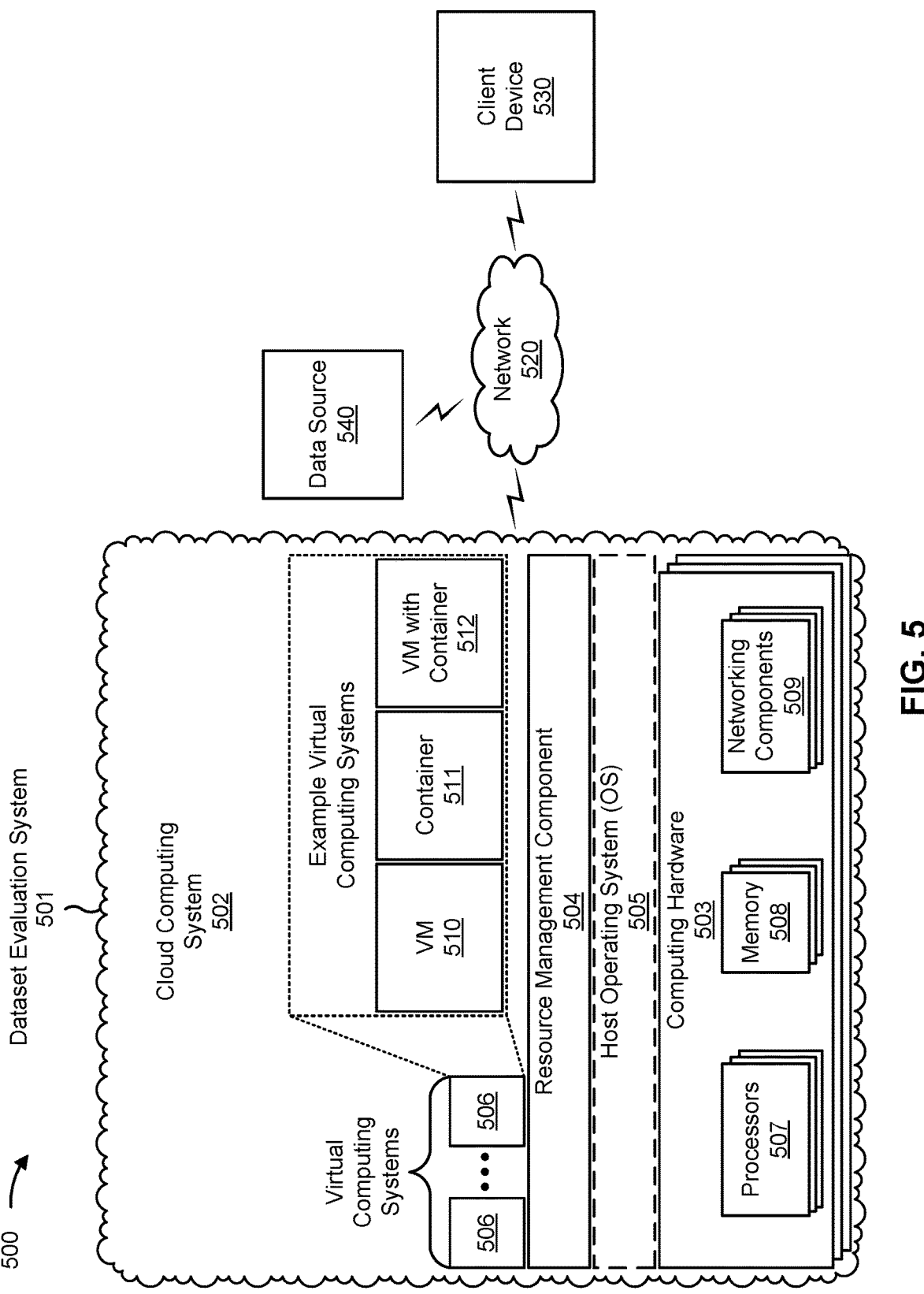
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include a dataset evaluation system 501, which may include one or more elements of and/or may execute within a cloud computing system 502. The dataset evaluation system 501 may correspond to the other dataset evaluation systems described herein with regard to FIGS. 1A-1D, FIGS. 2A-2E, or FIGS. 3A-3C, among other examples. The cloud computing system 502 may include one or more elements 503-512, as described in more detail below. As further shown in FIG. 5, environment 500 may include a network 520, a client device 530, and/or a data source 540. Devices and/or elements of environment 500 may interconnect via wired connections and/or wireless connections.

The cloud computing system 502 may include computing hardware 503, a resource management component 504, a host operating system (OS) 505, and/or one or more virtual computing systems 506. The cloud computing system 502 may execute on, for example, an Amazon Web Services platform, a Microsoft Azure platform, or a Snowflake platform. The resource management component 504 may perform virtualization (e.g., abstraction) of computing hardware 503 to create the one or more virtual computing systems 506. Using virtualization, the resource management component 504 enables a single computing device (e.g., a computer or a server) to operate like multiple computing devices, such as by creating multiple isolated virtual computing systems 506 from computing hardware 503 of the single computing device. In this way, computing hardware 503 can operate more efficiently, with lower power consumption, higher reliability, higher availability, higher utilization, greater flexibility, and lower cost than using separate computing devices.

The computing hardware 503 may include hardware and corresponding resources from one or more computing devices. For example, computing hardware 503 may include hardware from a single computing device (e.g., a single server) or from multiple computing devices (e.g., multiple servers), such as multiple computing devices in one or more data centers. As shown, computing hardware 503 may include one or more processors 507, one or more memories 508, and/or one or more networking components 509. Examples of a processor, a memory, and a networking component (e.g., a communication component) are described elsewhere herein.

The resource management component 504 may include a virtualization application (e.g., executing on hardware, such as computing hardware 503) capable of virtualizing computing hardware 503 to start, stop, and/or manage one or more virtual computing systems 506. For example, the resource management component 504 may include a hypervisor (e.g., a bare-metal or Type 1 hypervisor, a hosted or Type 2 hypervisor, or another type of hypervisor) or a virtual machine monitor, such as when the virtual computing systems 506 are virtual machines 510. Additionally, or alternatively, the resource management component 504 may include a container manager, such as when the virtual computing systems 506 are containers 511. In some implementations, the resource management component 504 executes within and/or in coordination with a host operating system 505.

A virtual computing system 506 may include a virtual environment that enables cloud-based execution of operations and/or processes described herein using computing hardware 503. As shown, a virtual computing system 506 may include a virtual machine 510, a container 511, or a hybrid environment 512 that includes a virtual machine and a container, among other examples. A virtual computing system 506 may execute one or more applications using a file system that includes binary files, software libraries, and/or other resources required to execute applications on a guest operating system (e.g., within the virtual computing system 506) or the host operating system 505.

Although the dataset evaluation system 501 may include one or more elements 503-512 of the cloud computing system 502, may execute within the cloud computing system 502, and/or may be hosted within the cloud computing system 502, in some implementations, the dataset evaluation system 501 may not be cloud-based (e.g., may be implemented outside of a cloud computing system) or may be partially cloud-based. For example, the dataset evaluation system 501 may include one or more devices that are not part of the cloud computing system 502, such as device 600 of FIG. 6, which may include a standalone server or another type of computing device. The dataset evaluation system 501 may perform one or more operations and/or processes described in more detail elsewhere herein.

The network 520 may include one or more wired and/or wireless networks. For example, the network 520 may include a cellular network, a public land mobile network (PLMN), a local area network (LAN), a wide area network (WAN), a private network, the Internet, and/or a combination of these or other types of networks. The network 520 enables communication among the devices of the environment 500.

The client device 530 may include one or more devices capable of receiving, generating, storing, processing, and/or providing information associated with analyzing datasets for whether private information is de-identified or anonymized. The client device 530 may include a communication device and/or a computing device. For example, the client device 530 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. The client device 530 may provide requests (e.g., to analyze a dataset) to and receive outputs (e.g., an inference risk assessment) from the dataset evaluation system 502

The data source 540 may include one or more devices capable of receiving, generating, storing, processing, and/or providing information associated with analyzing datasets for whether private information is de-identified or anonymized, as described elsewhere herein. The data source 540 may include a communication device and/or a computing device. For example, the data source 540 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data source 540 may provide datasets to the dataset evaluation system 502. The data source 540 may communicate with one or more other devices of environment 500, as described elsewhere herein.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of the environment 500 may perform one or more functions described as being performed by another set of devices of the environment 500.

Figure 6:
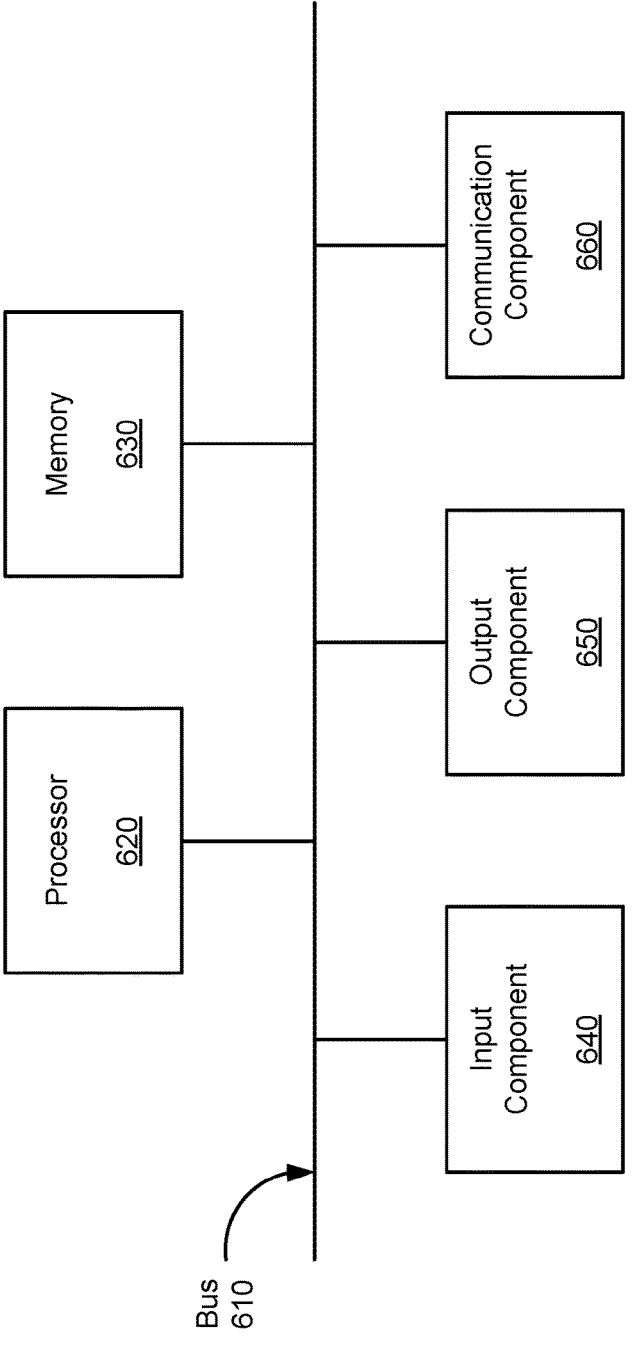
FIG. 6 is a diagram of example components of a device associated with dataset privacy management system.

FIG. 6 is a diagram of example components of a device 600 associated with dataset privacy management system. The device 600 may correspond to dataset evaluation system 501, client device 530, and/or data source 540. In some implementations, dataset evaluation system 501, client device 530, and/or data source 540 may include one or more devices 600 and/or one or more components of the device 600. As shown in FIG. 6, the device 600 may include a bus 610, a processor 620, a memory 630, an input component 640, an output component 650, and/or a communication component 660.

The bus 610 may include one or more components that enable wired and/or wireless communication among the components of the device 600. The bus 610 may couple together two or more components of FIG. 6, such as via operative coupling, communicative coupling, electronic coupling, and/or electric coupling. For example, the bus 610 may include an electrical connection (e.g., a wire, a trace, and/or a lead) and/or a wireless bus. The processor 620 may include a central processing unit, a graphics processing unit, a microprocessor, a controller, a microcontroller, a digital signal processor, a field-programmable gate array, an application-specific integrated circuit, and/or another type of processing component. The processor 620 may be implemented in hardware, firmware, or a combination of hardware and software. In some implementations, the processor 620 may include one or more processors capable of being programmed to perform one or more operations or processes described elsewhere herein.

The memory 630 may include volatile and/or nonvolatile memory. For example, the memory 630 may include random access memory (RAM), read only memory (ROM), a hard disk drive, and/or another type of memory (e.g., a flash memory, a magnetic memory, and/or an optical memory). The memory 630 may include internal memory (e.g., RAM, ROM, or a hard disk drive) and/or removable memory (e.g., removable via a universal serial bus connection). The memory 630 may be a non-transitory computer-readable medium. The memory 630 may store information, one or more instructions, and/or software (e.g., one or more software applications) related to the operation of the device 600. In some implementations, the memory 630 may include one or more memories that are coupled (e.g., communicatively coupled) to one or more processors (e.g., processor 620), such as via the bus 610. Communicative coupling between a processor 620 and a memory 630 may enable the processor 620 to read and/or process information stored in the memory 630 and/or to store information in the memory 630.

The input component 640 may enable the device 600 to receive input, such as user input and/or sensed input. For example, the input component 640 may include a touch screen, a keyboard, a keypad, a mouse, a button, a microphone, a switch, a sensor, a global positioning system sensor, an accelerometer, a gyroscope, and/or an actuator. The output component 650 may enable the device 600 to provide output, such as via a display, a speaker, and/or a light-emitting diode. The communication component 660 may enable the device 600 to communicate with other devices via a wired connection and/or a wireless connection. For example, the communication component 660 may include a receiver, a transmitter, a transceiver, a modem, a network interface card, and/or an antenna.

The device 600 may perform one or more operations or processes described herein. For example, a non-transitory computer-readable medium (e.g., memory 630) may store a set of instructions (e.g., one or more instructions or code) for execution by the processor 620. The processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hardwired circuitry may be used instead of or in combination with the instructions to perform one or more operations or processes described herein. Additionally, or alternatively, the processor 620 may be configured to perform one or more operations or processes described herein. Thus, implementations described herein are not limited to any specific combination of hardware circuitry and software.

The number and arrangement of components shown in FIG. 6 are provided as an example. The device 600 may include additional components, fewer components, different components, or differently arranged components than those shown in FIG. 6. Additionally, or alternatively, a set of components (e.g., one or more components) of the device 600 may perform one or more functions described as being performed by another set of components of the device 600.

FIG. 7 is a flowchart of an example process 700 associated with using a dataset privacy management system. In some implementations, one or more process blocks of FIG. 7 are performed by a dataset evaluation system (e.g., dataset evaluation system 501). In some implementations, one or more process blocks of FIG. 7 are performed by another device or a group of devices separate from or including the dataset evaluation system, such as a client device (e.g., client device 530). Additionally, or alternatively, one or more process blocks of FIG. 7 may be performed by one or more components of device 600, such as processor 620, memory 630, input component 640, output component 650, and/or communication component 660.

As shown in FIG. 7, process 700 may include receiving a target dataset (block 710). For example, the dataset evaluation system may receive a target dataset, as described above.

As further shown in FIG. 7, process 700 may include pre-processing the target dataset to generate a normalized target dataset (block 720). For example, the dataset evaluation system may pre-process the target dataset to generate a normalized target dataset, as described above.

As further shown in FIG. 7, process 700 may include processing the normalized target dataset with an intruder dataset to identify whether any quasi-identifiers are present in the normalized target dataset (block 730). For example, the dataset evaluation system may process the normalized target dataset with an intruder dataset to identify whether any quasi-identifiers are present in the normalized target dataset, as described above.

As further shown in FIG. 7, process 700 may include determining a Cartesian product of the normalized target dataset and the intruder dataset (block 740). For example, the dataset evaluation system may determine a Cartesian product of the normalized target dataset and the intruder dataset, as described above.

As further shown in FIG. 7, process 700 may include computing, using a distance linkage disclosure technique, an inference risk score for the target dataset with the intruder dataset based on the Cartesian product and whether any quasi-identifiers are present in the normalized target dataset (block 750). For example, the dataset evaluation system may compute, using a distance linkage disclosure technique, an inference risk score for the target dataset with the intruder dataset based on the Cartesian product and whether any quasi-identifiers are present in the normalized target dataset, as described above.

As further shown in FIG. 7, process 700 may include outputting information associated with the inference risk score (block 760). For example, the dataset evaluation system may output information associated with the inference risk score, as described above.

Process 700 may include additional implementations, such as any single implementation or any combination of implementations described below and/or in connection with one or more other processes described elsewhere herein.

In a first implementation, processing the dataset comprises applying min-max scaling of numerical features of the target dataset to scale variables of the target dataset to generate the normalized target dataset.

In a second implementation, alone or in combination with the first implementation, processing the normalized target dataset with the intruder dataset to identify whether any quasi-identifiers are present in the normalized target dataset comprises identifying whether one or more singleton records are present in the normalized target dataset.

In a third implementation, alone or in combination with one or more of the first and second implementations, processing the normalized target dataset with the intruder dataset to identify whether any quasi-identifiers are present in the normalized target dataset comprises identifying whether a functional dependency is present with respect to a subset of records in the normalized target dataset.

In a fourth implementation, alone or in combination with one or more of the first through third implementations, computing the inference risk score comprises computing a set of distances between sets of records using a Euclidean distance metric.

In a fifth implementation, alone or in combination with one or more of the first through fourth implementations, the inference risk score represents a disclosure risk of the target dataset relative to one or more external datasets.

In a sixth implementation, alone or in combination with one or more of the first through fifth implementations, outputting information associated with the inference risk score comprises outputting information identifying one or more compromised records in the target dataset.

Although FIG. 7 shows example blocks of process 700, in some implementations, process 700 includes additional blocks, fewer blocks, different blocks, or differently arranged blocks than those depicted in FIG. 7. Additionally, or alternatively, two or more of the blocks of process 700 may be performed in parallel.

FIG. 8 is a flowchart of an example process 800 associated with using a dataset privacy management system. In some implementations, one or more process blocks of FIG. 8 are performed by a dataset evaluation system (e.g., dataset evaluation system 501). In some implementations, one or more process blocks of FIG. 8 are performed by another device or a group of devices separate from or including the dataset evaluation system, such as a client device (e.g., the client device 530). Additionally, or alternatively, one or more process blocks of FIG. 8 may be performed by one or more components of device 600, such as processor 620, memory 630, input component 640, output component 650, and/or communication component 660.

As shown in FIG. 8, process 800 may include receiving a target dataset (block 810). For example, the dataset evaluation system may receive a target dataset, as described above.

As further shown in FIG. 8, process 800 may include pre-processing the target dataset to generate a normalized target dataset (block 820). For example, the dataset evaluation system may pre-process the target dataset to generate a normalized target dataset, as described above.

As further shown in FIG. 8, process 800 may include processing the normalized target dataset with an intruder dataset to identify whether any quasi-identifiers are present in the normalized target dataset (block 830). For example, the dataset evaluation system may process the normalized target dataset with an intruder dataset to identify whether any quasi-identifiers are present in the normalized target dataset, as described above.

As further shown in FIG. 8, process 800 may include generating an anonymized dataset based on the normalized target dataset (block 840). For example, the dataset evaluation system may generate an anonymized dataset based on the normalized target dataset, as described above.

As further shown in FIG. 8, process 800 may include joining the intruder dataset and the anonymized dataset to form a joined dataset (block 850). For example, the dataset evaluation system may join the intruder dataset and the anonymized dataset to form a joined dataset, as described above.

As further shown in FIG. 8, process 800 may include determining a first Cartesian product of the anonymized dataset and the intruder dataset and a second Cartesian product of the joined dataset and the intruder dataset (block 860). For example, the dataset evaluation system may determine a first Cartesian product of the anonymized dataset and the intruder dataset and a second Cartesian product of the joined dataset and the intruder dataset, as described above.

As further shown in FIG. 8, process 800 may include computing, using a distance linkage disclosure technique and based on whether any quasi-identifiers are present in the normalized target dataset, a first inference risk score for the target dataset with the intruder dataset with respect to the first Cartesian product and a second inference risk score for the target dataset and the intruder dataset with respect to the second Cartesian product (block 870). For example, the dataset evaluation system may compute, using a distance linkage disclosure technique and based on whether any quasi-identifiers are present in the normalized target dataset, a first inference risk score for the target dataset with the intruder dataset with respect to the first Cartesian product and a second inference risk score for the target dataset and the intruder dataset with respect to the second Cartesian product, as described above.

As further shown in FIG. 8, process 800 may include computing a distance linkage variation value based on the first inference risk score and the second inference risk score (block 880). For example, the dataset evaluation system may compute a distance linkage variation value based on the first inference risk score and the second inference risk score, as described above.

As further shown in FIG. 8, process 800 may include outputting information associated with the first inference risk score and the second inference risk score (block 890). For example, the dataset evaluation system may output information associated with the first inference risk score and the second inference risk score, as described above.

Process 800 may include additional implementations, such as any single implementation or any combination of implementations described below and/or in connection with one or more other processes described elsewhere herein.

In a first implementation, process 800 includes outputting information associated with anonymizing one or more records determined to be compromised based on the inference risk score.

In a second implementation, alone or in combination with the first implementation, the target dataset is a de-identified version of a core dataset, and the first inference risk score or the second inference risk score represents a disclosure risk of the core dataset relative to the target dataset.

In a third implementation, alone or in combination with one or more of the first and second implementations, process 800 includes applying group-level re-identification to the anonymized dataset and the intruder dataset to generate a set of clusters, and wherein the one or more processors, when configured to cause the dataset evaluation system to output information, are configured to cause the dataset evaluation system to outputting information regarding the set of clusters.

In a fourth implementation, alone or in combination with one or more of the first through third implementations, the first inference risk score or the second inference risk score is based on the set of clusters.

Although FIG. 8 shows example blocks of process 800, in some implementations, process 800 includes additional blocks, fewer blocks, different blocks, or differently arranged blocks than those depicted in FIG. 8. Additionally, or alternatively, two or more of the blocks of process 800 may be performed in parallel.

FIG. 9 is a flowchart of an example process 900 associated with using a dataset privacy management system. In some implementations, one or more process blocks of FIG. 9 are performed by a dataset evaluation system (e.g., dataset evaluation system 501). In some implementations, one or more process blocks of FIG. 9 are performed by another device or a group of devices separate from or including the dataset evaluation system, such as a client device (e.g., the client device 530). Additionally, or alternatively, one or more process blocks of FIG. 9 may be performed by one or more components of device 600, such as processor 620, memory 630, input component 640, output component 650, and/or communication component 660.

As shown in FIG. 9, process 900 may include receiving an initial dataset (block 910). For example, the dataset evaluation system may receive an initial dataset, as described above.

As further shown in FIG. 9, process 900 may include anonymizing the initial dataset to generate a target dataset (block 920). For example, the dataset evaluation system may anonymize the initial dataset to generate a target dataset, as described above.

As further shown in FIG. 9, process 900 may include pre-processing the target dataset to generate a normalized target dataset (block 930). For example, the dataset evaluation system may pre-process the target dataset to generate a normalized target dataset, as described above.

As further shown in FIG. 9, process 900 may include determining a Cartesian product of the normalized target dataset and an intruder dataset (block 940). For example, the dataset evaluation system may determine a Cartesian product of the normalized target dataset and an intruder dataset, as described above.

As further shown in FIG. 9, process 900 may include computing, using a distance linkage disclosure technique, an inference risk score for the target dataset with the intruder dataset based on the Cartesian product (block 950). For example, the dataset evaluation system may compute, using a distance linkage disclosure technique, an inference risk score for the target dataset with the intruder dataset based on the Cartesian product, as described above.

As further shown in FIG. 9, process 900 may include identifying one or more compromised records based on the inference risk score (block 960). For example, the dataset evaluation system may identify one or more compromised records based on the inference risk score, as described above.

As further shown in FIG. 9, process 900 may include generating fuzzing data for the one or more compromised records (block 970). For example, the dataset evaluation system may generate fuzzing data for the one or more compromised records, as described above.

As further shown in FIG. 9, process 900 may include updating the initial dataset with the fuzzing data (block 980). For example, the dataset evaluation system may update the initial dataset with the fuzzing data, as described above.

As further shown in FIG. 9, process 900 may include outputting information associated with the initial dataset based on updating the initial dataset (block 990). For example, the dataset evaluation system may output information associated with the initial dataset based on updating the initial dataset, as described above.

Process 900 may include additional implementations, such as any single implementation or any combination of implementations described below and/or in connection with one or more other processes described elsewhere herein.

In a first implementation, process 900 includes generating one or more alternate records based on the one or more compromised records, determining whether the one or more alternate records are compromised based on an updated inference risk score, and replacing the one or more records with the one or more alternate records in the initial dataset based on determining that the one or more alternate records are not compromised.

In a second implementation, alone or in combination with the first implementation, process 900 includes identifying whether one or more singleton records are present in the normalized target dataset.

In a third implementation, alone or in combination with one or more of the first and second implementations, process 900 includes outputting a subset of the initial dataset.

In a fourth implementation, alone or in combination with one or more of the first through third implementations, process 900 includes outputting a certification of the initial dataset.

In a fifth implementation, alone or in combination with one or more of the first through fourth implementations, the inference risk score represents a disclosure risk of the target dataset relative to one or more external datasets.

In a sixth implementation, alone or in combination with one or more of the first through fifth implementations, the inference risk score represents a disclosure risk of the target dataset relative to the initial dataset.

In a seventh implementation, alone or in combination with one or more of the first through sixth implementations, process 900 includes outputting information identifying the one or more compromised records in the target dataset.

Although FIG. 9 shows example blocks of process 900, in some implementations, process 900 includes additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a dataset evaluation system comprising one or more processors, a target dataset;
pre-processing, by the dataset evaluation system, the target dataset to generate a normalized target dataset;
processing, by the dataset evaluation system, the normalized target dataset with an intruder dataset to identify whether any quasi-identifiers are present in the normalized target dataset;
generating, by the dataset evaluation system, an anonymized dataset based on the normalized target dataset, wherein the anonymized dataset includes an initial dataset of network traffic from user equipment's (UE), in proximity to a cell tower, for which user identifiers have been removed and replaced with anonymous unique identifiers, wherein the initial dataset is received by the dataset evaluation system via a wireless network;
joining, by the dataset evaluation system, the intruder dataset and the anonymized dataset to form a joined dataset;
determining, by the dataset evaluation system, a first Cartesian product of the anonymized dataset and the intruder dataset and a second Cartesian product of the joined dataset and the intruder dataset;
computing, by the dataset evaluation system and using a distance linkage disclosure technique based on whether any quasi-identifiers are present in the normalized target dataset, a first inference risk score for the target dataset with the intruder dataset with respect to the first Cartesian product and a second inference risk score for the target dataset and the intruder dataset with respect to the second Cartesian product;
outputting, by the dataset evaluation system, information associated with the first inference risk score and the second inference risk score,
wherein the one or more processors are configured to further cause the dataset evaluation system to:
apply group-level re-identification to the anonymized dataset and the intruder dataset to generate a set of equivalent clusters, wherein applying the group-level re-identification to the anonymized dataset and the intruder dataset comprises:
extracting a first feature set and a second feature set associated with the target dataset, by performing natural language processing on the received target dataset using a machine learning model, wherein the machine learning model is trained using datasets having different levels of de-identification techniques applied and wherein the machine learning model is trained to predict whether personal identifiable data is determined from the target dataset;
identifying a first set of clusters corresponding to the anonymized dataset with respect to the first feature set and the second feature set;
identifying a second set of clusters corresponding to the intruder dataset with respect to the first feature set and the second feature set;
determining intersections within the first set of clusters and the second set of clusters; and
applying the intersections of the first set of clusters from the anonymized dataset to the intersections of the second set of clusters from the intruder dataset to generate the set of equivalent clusters, and
wherein the one or more processors, when configured to cause the dataset evaluation system to output information, are configured to cause the dataset evaluation system to output the information regarding the generated set of equivalent clusters; and
performing automated actions based on the prediction by the trained machine learning model.

2. The method of claim 1, wherein pre-processing the target dataset comprises:
applying min-max scaling of numerical features of the target dataset to scale variables of the target dataset to generate the normalized target dataset.

3. The method of claim 1, wherein processing the normalized target dataset with the intruder dataset to identify whether any quasi-identifiers are present in the normalized target dataset comprises:
identifying whether one or more singleton records are present in the normalized target dataset.

4. The method of claim 1, wherein processing the normalized target dataset with the intruder dataset to identify whether any quasi-identifiers are present in the normalized target dataset comprises:
identifying whether a functional dependency is present with respect to a subset of records in the normalized target dataset.

5. The method of claim 1, wherein computing the first inference risk score and the second inference risk score comprises: computing a set of distances between sets of records using a Euclidean distance metric.

6. The method of claim 1, wherein the first inference risk score and the second inference risk score represent a disclosure risk of the target dataset relative to one or more external datasets.

7. The method of claim 1, wherein outputting information associated with the first inference risk score and the second inference risk score comprises:
outputting information identifying one or more compromised records in the target dataset.

8. A dataset evaluation system, comprising:
one or more memories; and
one or more processors, coupled to the one or more memories, configured to:

receive a target dataset;

pre-process the target dataset to generate a normalized target dataset;

process the normalized target dataset with an intruder dataset to identify whether any quasi-identifiers are present in the normalized target dataset;

generate an anonymized dataset based on the normalized target dataset, wherein the anonymized dataset includes an initial dataset of network traffic from user equipment's (UE), in proximity to a cell tower, for which user identifiers have been removed and replaced with anonymous unique identifiers, wherein the initial dataset is received by the dataset evaluation system via a wireless network;

join the intruder dataset and the anonymized dataset to form a joined dataset;

determine a first Cartesian product of the anonymized dataset and the intruder dataset and a second Cartesian product of the joined dataset and the intruder dataset;

compute, using a distance linkage disclosure technique and based on whether any quasi-identifiers are present in the normalized target dataset, a first inference risk score for the target dataset with the intruder dataset with respect to the first Cartesian product and a second inference risk score for the target dataset and the intruder dataset with respect to the second Cartesian product;

compute a distance linkage variation value based on the first inference risk score and the second inference risk score;

output information associated with the first inference risk score and the second inference risk score, wherein the one or more processors are further configured to cause the dataset evaluation system to:

apply group-level re-identification to the anonymized dataset and the intruder dataset to generate a set of equivalent clusters, wherein for applying the group-level re-identification to the anonymized dataset and the intruder dataset, the one or more processors are configured to:

extract a first feature set and a second feature set associated with the target dataset, by performing natural language processing on the received target dataset using a machine learning model, wherein the machine learning model is trained using datasets having different levels of de-identification techniques applied and wherein the machine learning model is trained to predict whether personal identifiable data is determined from the target dataset;

identify a first set of clusters corresponding to the anonymized dataset with respect to the first feature set and the second feature set;

identify a second set of clusters corresponding to the intruder dataset with respect to the first feature set and the second feature set;

determine intersections within the first set of clusters and the second set of clusters; and apply the intersections of the first set of clusters from the anonymized dataset to the intersections of the second set of clusters from the intruder dataset to generate the set of equivalent clusters, and wherein the one or more processors, when configured to cause the dataset evaluation system to output information, are configured to cause the dataset evaluation system to output the information regarding the generated set of equivalent clusters; and performing automated actions based on the prediction by the trained machine learning model.

9. The dataset evaluation system of claim 8, wherein the one or more processors, when configured to cause the dataset evaluation system to output information associated with the first inference risk score and the second inference risk score, are configured to cause the dataset evaluation system to:

output information associated with anonymizing one or more records determined to be compromised based on the first inference risk score and the second inference risk score.

10. The dataset evaluation system of claim 8, wherein the target dataset is a de-identified version of a core dataset, and the first inference risk score or the second inference risk score represents a disclosure risk of the core dataset relative to the target dataset.

11. The dataset evaluation system of claim 8, wherein the first inference risk score or the second inference risk score is based on the set of clusters.

12. A non-transitory computer-readable medium storing a set of instructions, the set of instructions comprising:

one or more instructions that, when executed by one or more processors of a dataset evaluation system, cause the dataset evaluation system to:

receive an initial dataset via a wireless network;

anonymize the initial dataset to generate a target dataset;

pre-process the target dataset to generate a normalized target dataset;

process the normalized target dataset with an intruder dataset to identify whether any quasi-identifiers are present in the normalized target dataset;

generate an anonymized dataset based on the normalized target dataset, wherein the anonymized dataset includes the initial dataset of network traffic from user equipment's (UE), in proximity to a cell tower, for which user identifiers have been removed and replaced with anonymous unique identifiers;

join the intruder dataset and the anonymized dataset to form a joined dataset;

determine a first Cartesian product of the anonymized dataset and the intruder dataset and a second Cartesian product of the joined dataset and the intruder dataset;

compute, using a distance linkage disclosure technique and based on whether any quasi-identifiers are present in the normalized target dataset, a first inference risk score for the target dataset with the intruder dataset with respect to the first Cartesian product and a second inference risk score for the target dataset and the intruder dataset with respect to the second Cartesian product;

compute a distance linkage variation value based on the first inference risk score and the second inference risk score;

identify one or more compromised records based on the first inference risk score and the second inference risk score;

generate fuzzing data for the one or more compromised records;

update the initial dataset with the fuzzing data; and output information associated with the initial dataset via the wireless network, based on updating the initial dataset, and the first inference risk score and the second inference risk score;

wherein the one or more instructions that, when executed by the one or more processors of a dataset evaluation system, further cause the dataset evaluation system to:

apply group-level re-identification to the anonymized dataset and the intruder dataset to generate a set of equivalent clusters, wherein for applying the group-level re-identification to the anonymized dataset and the intruder dataset, the one or more processors are configured to:

extract a first feature set and a second feature set associated with the target dataset, by performing natural language processing on the received target dataset using a machine learning model, wherein the machine learning model is trained using datasets having different levels of de-identification techniques applied and wherein the machine learning model is trained to predict whether personal identifiable data is determined from the target dataset;

identify a first set of clusters corresponding to the anonymized dataset with respect to the first feature set and the second feature set;

identify a second set of clusters corresponding to the intruder dataset with respect to the first feature set and the second feature set;

determine intersections within the first set of clusters and the second set of clusters; and apply the intersections of the first set of clusters from the anonymized dataset to the intersections of the second set of clusters from the intruder dataset to generate the set of equivalent clusters, and wherein the one or more processors, when configured to cause the dataset evaluation system to output information, are configured to cause the dataset evaluation system to output the information regarding the generated set of equivalent clusters; and performing automated actions based on the prediction by the trained machine learning model.

13. The non-transitory computer-readable medium of claim 12, wherein the one or more instructions, that cause the dataset evaluation system to generate the fuzzing data, cause the dataset evaluation system to:

generate one or more alternate records based on the one or more compromised records;

determine whether the one or more alternate records are compromised based on an updated inference risk score; and replace the compromised one or more records with the one or more alternate records in the initial dataset based on determining that the one or more alternate records are not compromised.

14. The non-transitory computer-readable medium of claim 12, wherein the one or more instructions, that cause the dataset evaluation system to process the normalized target dataset with the intruder dataset, cause the dataset evaluation system to:

identify whether one or more singleton records are present in the normalized target dataset.

15. The non-transitory computer-readable medium of claim 12, wherein the one or more instructions, that cause the dataset evaluation system to output information associated with the initial dataset based on updating the initial dataset, cause the dataset evaluation system to:

output a subset of the initial dataset.

16. The non-transitory computer-readable medium of claim 12, wherein the one or more instructions, that cause the dataset evaluation system to output information associated with the initial dataset based on updating the initial dataset, cause the dataset evaluation system to:

output a certification of the initial dataset.

17. The non-transitory computer-readable medium of claim 12, wherein the first inference risk score and the second inference risk score represent a disclosure risk of the target dataset relative to one or more external datasets.

18. The non-transitory computer-readable medium of claim 12, wherein the first inference risk score and the second inference risk score represent a disclosure risk of the target dataset relative to the initial dataset.

19. The non-transitory computer-readable medium of claim 12, wherein the one or more instructions, that cause the dataset evaluation system to output information associated with the initial dataset, cause the dataset evaluation system to:

output information identifying the one or more compromised records in the target dataset.

\* \* \* \* \*